United States Patent
Morin et al.

(10) Patent No.: US 11,170,433 B2
(45) Date of Patent: Nov. 9, 2021

(54) METHOD AND SYSTEM FOR USING MACHINE LEARNING TECHNIQUES TO MAKE HIGHLY RELEVANT AND DE-DUPLICATED OFFER RECOMMENDATIONS

(71) Applicant: Intuit Inc., Mountain View, CA (US)

(72) Inventors: Yao H. Morin, San Diego, CA (US);
James Jennings, San Diego, CA (US);
Christian A. Rodriguez, Palo Alto, CA (US); Lei Pei, Sunnyvale, CA (US);
Jyotiswarup Pai Raiturkar, Bellandur (IN)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 16/912,457

(22) Filed: Jun. 25, 2020

(65) Prior Publication Data
US 2020/0327604 A1 Oct. 15, 2020

Related U.S. Application Data

(63) Continuation of application No. 15/866,005, filed on Jan. 9, 2018, now Pat. No. 10,706,453.

(51) Int. Cl.
*G06Q 30/00* (2012.01)
*G06Q 30/06* (2012.01)
*G06N 20/00* (2019.01)

(52) U.S. Cl.
CPC ......... *G06Q 30/0631* (2013.01); *G06N 20/00* (2019.01)

(58) Field of Classification Search
None
See application file for complete search history.

(56) References Cited

U.S. PATENT DOCUMENTS 7,565,312 B1    7/2009 Shaw et al.
7,885,902 B1*   2/2011 Shoemaker ............ G06Q 10/10
                                                   705/319
(Continued)

FOREIGN PATENT DOCUMENTS

CN    107222875 A    9/2017
CN    107844798 A    3/2018
(Continued)

OTHER PUBLICATIONS

Kelleher et al., "Solutions Manual for Fundamentals of Machine Learning for Predictive Data Analytics," Apr. 22, 2015, Retrieved online on May 20, 2021 at http://machinelearningbook.com/wp-content/uploads/2015/07/FMLPDA_freely_avail_solutions.pdf, X-pages (Year 2015).

(Continued)

*Primary Examiner* — Mila Airapetian
(74) *Attorney, Agent, or Firm* — Paradice and Li LLP

(57) ABSTRACT

Big data analysis methods and machine learning based models are used to provide offer recommendations to consumers that are probabilistically determined to be relevant to a given consumer. Machine learning based matching of user attributes and offer attributes is first performed to identify potentially relevant offers for a given consumer. A de-duplication process is then used to identify and eliminate any offers represented in the offer data that the consumer has already seen, has historically shown no interest in, has already accepted, that are directed to product or service types the user/consumer already owns, for which the user does not qualify, or that are otherwise deemed to be irrelevant to the consumer.

20 Claims, 7 Drawing Sheets

(56) References Cited

U.S. PATENT DOCUMENTS

| | | |
|---|---|---|
| 8,942,999 B1 | 1/2015 | Fernando et al. |
| 9,135,300 B1 | 9/2015 | Yang et al. |
| 9,785,534 B1 | 10/2017 | Paulus et al. |
| 9,930,102 B1 | 3/2018 | Paulus et al. |
| 10,706,453 B1 | 7/2020 | Morin et al. |
| 2010/0169245 A1* | 7/2010 | Basel ............ G06N 20/00 706/12 |
| 2011/0264569 A1 | 10/2011 | Houseworth et al. |
| 2013/0198047 A1 | 8/2013 | Houseworth et al. |
| 2013/0290339 A1 | 10/2013 | LuVogt et al. |
| 2016/0148322 A1 | 5/2016 | Mascaro et al. |
| 2017/0083963 A1 | 3/2017 | Agarwal |
| 2018/0053120 A1 | 2/2018 | Mukherjee et al. |
| 2018/0165758 A1 | 6/2018 | Saxena et al. |
| 2018/0189827 A1 | 7/2018 | Paw et al. |
| 2018/0211270 A1 | 7/2018 | Wu et al. |

FOREIGN PATENT DOCUMENTS

| | | |
|---|---|---|
| KR | 101739538 B1 | 5/2017 |
| WO | 2016084336 A1 | 6/2016 |

OTHER PUBLICATIONS

McKinsey and Company, "Marketing & Sales Big Data, Analytics, and the Future of Marketing & Sales," Mar. 2015, retrieved online on May 20, 2021 at https://www.mckinsey.com/~/media/McKinsey/Business%20Functions/Marketing%20and%20Sales/Our%20Insights/EBook%20Big%20data%20analytics%20and%20the%20future%20of%20marketing%20sales/Big-Data-eBook.ashx, 60-pages (Year 2015).

\* cited by examiner

300

| Inputs (X) 301 | | | | Labels (Y) 303 | |
|---|---|---|---|---|---|
| User Profile | | User Behavior | | User Attributes | |
| User Age | User Credit Score | Event ID | Time Lapse (ms) | Tracker? | Spender? |
| 35 | 760 | a1030 | 2000 | 1 | 0 |
| 24 | 780 | a779 | 5 | 0 | 1 |
| 76 | 882 | b76 | 98 | 1 | 1 |
| 22 | 650 | a200 | 100 | 1 | 0 |
| 17 | 600 | c66 | 55 | 0 | 1 |
| 56 | 820 | b90 | 32 | 0 | 1 |

| User Attributes 311 | | | Offer Attributes 313 | | | User Usage 315 |
|---|---|---|---|---|---|---|
| User ID | User Age Group | User Credit Score Band | Institution | Type | Rewards | (0 or 1) |
| 20910 | 15-24 | Good | Wellsfargo | CC | Miles | 1 |
| 20910 | 15-24 | Good | Chase | CC | Points | 0 |
| 29384 | 55+ | High | Wellsfargo | Checking | Cash | 1 |
| 20933 | 25-34 | Good | Amex | CC | Miles | 1 |
| 30999 | 25-34 | Good | Amex | CC | Miles | 0 |
| 37280 | 55+ | High | Discover | CC | Cash | 1 |

FIG. 3B

METHOD AND SYSTEM FOR USING MACHINE LEARNING TECHNIQUES TO MAKE HIGHLY RELEVANT AND DE-DUPLICATED OFFER RECOMMENDATIONS

CROSS-REFERENCE TO RELATED APPLICATIONS

This patent application is a continuation of, and claims priority to, U.S. patent application Ser. No. 15/866,005 entitled "METHOD AND SYSTEM FOR USING MACHINE LEARNING TECHNIQUES TO MAKE HIGHLY RELEVANT AND DE-DUPLICATED OFFER RECOMMENDATIONS" and filed on Jan. 9, 2018, which is assigned to the assignee hereof. The disclosures of all prior applications are considered part of and are incorporated by reference in this patent application.

TECHNICAL FIELD

This disclosure relates generally to machine learning, and more specifically to leveraging user data derived model training data obtained from multiple sources.

DESCRIPTION OF THE RELATED TECHNOLOGY

The development and widespread acceptance of electronic media, the Internet, and various other methods of electronic communication have made it significantly easier for providers of products and services to disseminate offers related to their products and services to a wide range of potential customers. However, one problem that has arisen, largely due to the relatively low cost, ease, and potential effectiveness, of distributing offers via systems such as the Internet, is that the average consumer is now so inundated with often irrelevant product and service offers that the offers have become background noise. Consequently, using current methods, product and service offers are often largely, if not entirely, ignored by the potential customers. This is clearly not a desirable situation for the distributors/providers of the offers. However, the situation is also far from ideal for the consumers given that many offers that are desirable and valuable to given consumer are lost or ignored in the blizzard of irrelevant offers a typical consumer is subjected to on an almost daily basis.

The development and widespread acceptance of electronic media, the Internet, and various other methods of electronic communication have made it significantly easier for providers of products and services to disseminate offers related to their products and services to a wide range of potential customers. However, one problem that has arisen, largely due to the relatively low cost, ease, and potential effectiveness, of distributing offers via systems such as the Internet, is that the average consumer is now so inundated with often irrelevant product and service offers that the offers have become background noise. Consequently, using current methods, product and service offers are often largely, if not entirely, ignored by the potential customers. This is clearly not a desirable situation for the distributors/providers of the offers. However, the situation is also far from ideal for the consumers given that many offers that are desirable and valuable to given consumer are lost or ignored in the blizzard of irrelevant offers a typical consumer is subjected to on an almost daily basis.

In addition, due to the fact that many widely distributed offers are not relevant to given consumer, a growing number of consumers not only ignore offers presented to them, but find the seemingly endless presentation of offers a significant annoyance in their life. Since many offers are electronic media based offers provided to consumers through the Internet, and third-party platforms such as search engines, webpages, software applications and systems, and various other electronic media based platforms, the annoyance of a consumer is potentially even more problematic since it is highly likely that the consumer will become equally annoyed, if not more annoyed, with the platform through which offers are being presented.

When a provider of a product or service disseminates offers to consumers in a more less blanket manner, it is quite possible that the product or service that is the subject matter of the offer is already owned by the consumer; has already been turned down, or otherwise passed up, by the consumer; is a product or service for which the consumer simply does not qualify; is a product or service equivalent to a product or service already owned by the consumer; or is otherwise irrelevant or redundant with respect to a given consumer. When this is the case, there is a very high probability that the consumer will come to consider the offer as a waste of their time which, in turn, results in a very high probability that the consumer will become annoyed with not only the offer itself, but also the product and service offered, and the provider of the product and service. This negative impression can remain in the mind of the consumer and cost the provider of the product of the service a present customer and/or future sales. Clearly this is the opposite of the effect desired.

As discussed above, there is a long-standing technical need in the electronic offer distribution arts for a technical solution to the technical problem of only recommending offers to consumers that are relevant to the individual consumers in terms of the interest level of the consumers, the qualifications of the consumers, the needs of the consumers, and the likelihood of the consumers accepting the offer. In addition, the introduction of the Internet as a platform for the distribution of electronic media based offers has made the need for a technical solution to the problem of recommending only relevant offers to consumers an even more immediate and important issue.

SUMMARY

The systems, methods and devices of this disclosure each have several innovative aspects, no single one of which is solely responsible for the desirable attributes disclosed herein.

One innovative aspect of the subject matter described in this disclosure can be implemented as a method for recommending relevant and non-duplicative offers to a user of a financial management system. The method can be performed by the financial management computing system, and can include receiving offer data including current offers and historical offers made by the user for products or services associated with the financial management computing system; receiving raw user data for a plurality of users of the financial management computing system, the raw user data including one or more of profile data, behavior data, preference data, transaction data, or credit history data for each of the plurality of users; transforming the raw user data into model training data using one or more processors of the financial management computing system, the model training data including one or more of profile training data, behavior training data, preference training data, transaction training data, or credit history training data; training a user/offer attribute matching model with the model training data using a machine learning process to identify attribute matching data indicative of correlations between pairs of user attributes and offer attributes; training an offer recommendation model with one or both of the model training data and the attribute matching data using a machine learning process to identify potential offers to be recommended to one or more users of the plurality of users; determining the attribute matching information by executing the trained user/offer attribute matching model, the determined attribute matching information indicating whether pairs of user attributes and offer attributes match or mismatch one another; generating de-duplicated offer data by removing, from the offer data, offers that the user has already seen, offers that the user has already accepted, offers that the user has historically shown no interest in, or offers for which the user does not qualify; generating one or more recommended offers for the user by executing the trained offer recommendation model based on the determined attribute matching information and the de-duplicated offer data; and presenting the one or more recommended offers on a display screen viewable by the user.

The user attributes can include one or more of an age group, an income group, general user demographics, health, education, employment, a residence area, financial preferences, financial behavior, spending behavior, saving behavior, or risk tolerance. The offer attributes can include one or more of the names of providers associated with the offers, categories of the providers associated with the offers, terms of the offers, rewards or loyalty programs associated with the offers, or approval criteria or acceptance rates associated with the offers.

The method can also include training a personal attribute extraction model with one or more of the profile training data, the behavior training data, or the preference training data of the model training data using a machine learning process to identify one or more personal attributes of the user, and extracting the personal attributes of the user from the raw user data by executing the trained personal attribute extraction model based on one or more of the user's profile data, behavior data, or preference data. In some implementations, the personal attribute extraction model comprises a supervised predictive model configured to receive the profile model training data, the behavior model training data, and the preference model training data as input data, and to receive one or more of the user's personal attributes as labels. In some instances, the personal attributes can include one or more of an age group, an income group, general user demographics, health, education, employment, a residence area, financial preferences, financial behavior, spending behavior, saving behavior, or risk tolerance.

In some implementations, the method can also include training a financial attribute extraction model with the transaction model training data and the credit history model training data using a machine learning process to identify one or more financial attributes of the user, and extracting the financial attributes of the user from the raw user data by executing the trained financial attribute extraction model based on one or both of the user's transaction data and the user's credit history data. In some instances, the financial attributes includes one or more of spending characteristics, merchants used, types of purchases, products and services recently or historically purchased, financial situation, financial characteristics, historical transaction amounts, payees, transaction locations, transaction recurrence or frequency of transactions, withdrawals, mortgage/rent payments, credit card payments, charitable contributions, alimony or child support payments, income, insurance payments, credit card account data, loan/mortgage, credit scores, debt to income ratio data, or bank account balances.

In some other implementations, the method can also include training a historical offer extraction model with the transaction model training data and the credit history model training data using a machine learning process to identify historical offers of the user, and determining the historical offers by executing the trained historical offer extraction model based on one or both of the user's transaction data and the user's credit history data. In some instances, the credit history data can include one or more of current and historical credit scores, debt to income ratio data, account balances, credit balances, credit card account data, loan/mortgage data, savings account balance data, checking account balance data, overdraft account balance data, and personal information data. In some other instances, the transaction data can include one or more of historical transaction amounts, historical transaction payees, items purchased, purchase locations, recurrence of transactions, frequency of transactions, withdrawals, mortgage/rent payments, credit card payments, charitable contributions, alimony or child support payments, expense transactions, income transactions, or insurance payments.

Another innovative aspect of the subject matter described in this disclosure can be implemented by a financial management computing system. The financial management computing system can include one or more processors coupled to a memory. In some implementations, the memory stores instructions that, when executed by the one or more processors, causes the system to receive offer data including current offers and historical offers made by the user for products or services associated with the financial management computing system; receive raw user data for a plurality of users of the financial management computing system, the raw user data including one or more of profile data, behavior data, preference data, transaction data, or credit history data for each of the plurality of users; transform the raw user data into model training data using one or more processors of the financial management computing system, the model training data including one or more of profile training data, behavior training data, preference training data, transaction training data, and credit history training data; train a user/offer attribute matching model with the model training data using a machine learning process to identify attribute matching data indicative of correlations between pairs of user attributes and offer attributes; train an offer recommendation model with one or both of the model training data and the attribute matching data using a machine learning process to identify potential offers to be recommended to one or more users of the plurality of users; determine the attribute matching information by executing the trained user/offer attribute matching model, the determined attribute matching information indicating whether pairs of user attributes and offer attributes match or mismatch one another; generate de-duplicated offer data by removing, from the offer data, offers that the user has already seen, offers that the user has already accepted, offers that the user has historically shown no interest in, or offers for which the user does not qualify; generate one or more recommended offers for the user by executing the trained offer recommendation model based on the determined attribute matching information and the de-duplicated offer data; and present the one or more recommended offers on a display screen viewable by the user.

The user attributes can include one or more of an age group, an income group, general user demographics, health, education, employment, a residence area, financial preferences, financial behavior, spending behavior, saving behavior, or risk tolerance. The offer attributes can include one or more of the names of providers associated with the offers, categories of the providers associated with the offers, terms of the offers, rewards or loyalty programs associated with the offers, or approval criteria or acceptance rates associated with the offers.

Execution of the instructions can also cause the financial management computing system to train a personal attribute extraction model with one or more of the profile training data, the behavior training data, or the preference training data of the model training data using a machine learning process to identify one or more personal attributes of the user, and to extract the personal attributes of the user from the raw user data by executing the trained personal attribute extraction model based on one or more of the user's profile data, behavior data, or preference data. In some implementations, the personal attribute extraction model is a supervised predictive model configured to receive the profile model training data, the behavior model training data, and the preference model training data as input data, and to receive one or more of the user's personal attributes as labels. In some instances, the personal attributes can include one or more of an age group, an income group, general user demographics, health, education, employment, a residence area, financial preferences, financial behavior, spending behavior, saving behavior, or risk tolerance.

In some implementations, execution of the instructions further causes the financial management computing system to train a financial attribute extraction model with the transaction model training data and the credit history model training data using a machine learning process to identify one or more financial attributes of the user, and to extract the financial attributes of the user from the raw user data by executing the trained financial attribute extraction model based on one or both of the user's transaction data and the user's credit history data. In some instances, the financial attributes includes one or more of spending characteristics, merchants used, types of purchases, products and services recently or historically purchased, financial situation, financial characteristics, historical transaction amounts, payees, transaction locations, transaction recurrence or frequency of transactions, withdrawals, mortgage/rent payments, credit card payments, charitable contributions, alimony or child support payments, income, insurance payments, credit card account data, loan/mortgage, credit scores, debt to income ratio data, or bank account balances.

In some other implementations, execution of the instructions further causes the financial management computing system to train a historical offer extraction model with the transaction model training data and the credit history model training data using a machine learning process to identify historical offers of the user, and to determine the historical offers by executing the trained historical offer extraction model based on one or both of the user's transaction data and the user's credit history data. In some instances, the credit history data can include one or more of current and historical credit scores, debt to income ratio data, account balances, credit balances, credit card account data, loan/mortgage data, savings account balance data, checking account balance data, overdraft account balance data, and personal information data. In some other instances, the transaction data can include one or more of historical transaction amounts, historical transaction payees, items purchased, purchase locations, recurrence of transactions, frequency of transactions, withdrawals, mortgage/rent payments, credit card payments, charitable contributions, alimony or child support payments, expense transactions, income transactions, or insurance payments.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

FIG. 3A is an illustrative example of a machine learning mapping data structure table for training a personal attribute extraction model of a user feature engineering module, in accordance with one embodiment.

FIG. 3B is an illustrative example of a machine learning mapping data structure for training a user/offer attribute mapping model of a feature engineering module, in accordance with one embodiment.

Like reference numbers and designations in the various drawings indicate like elements.

DETAILED DESCRIPTION

Figure 1:
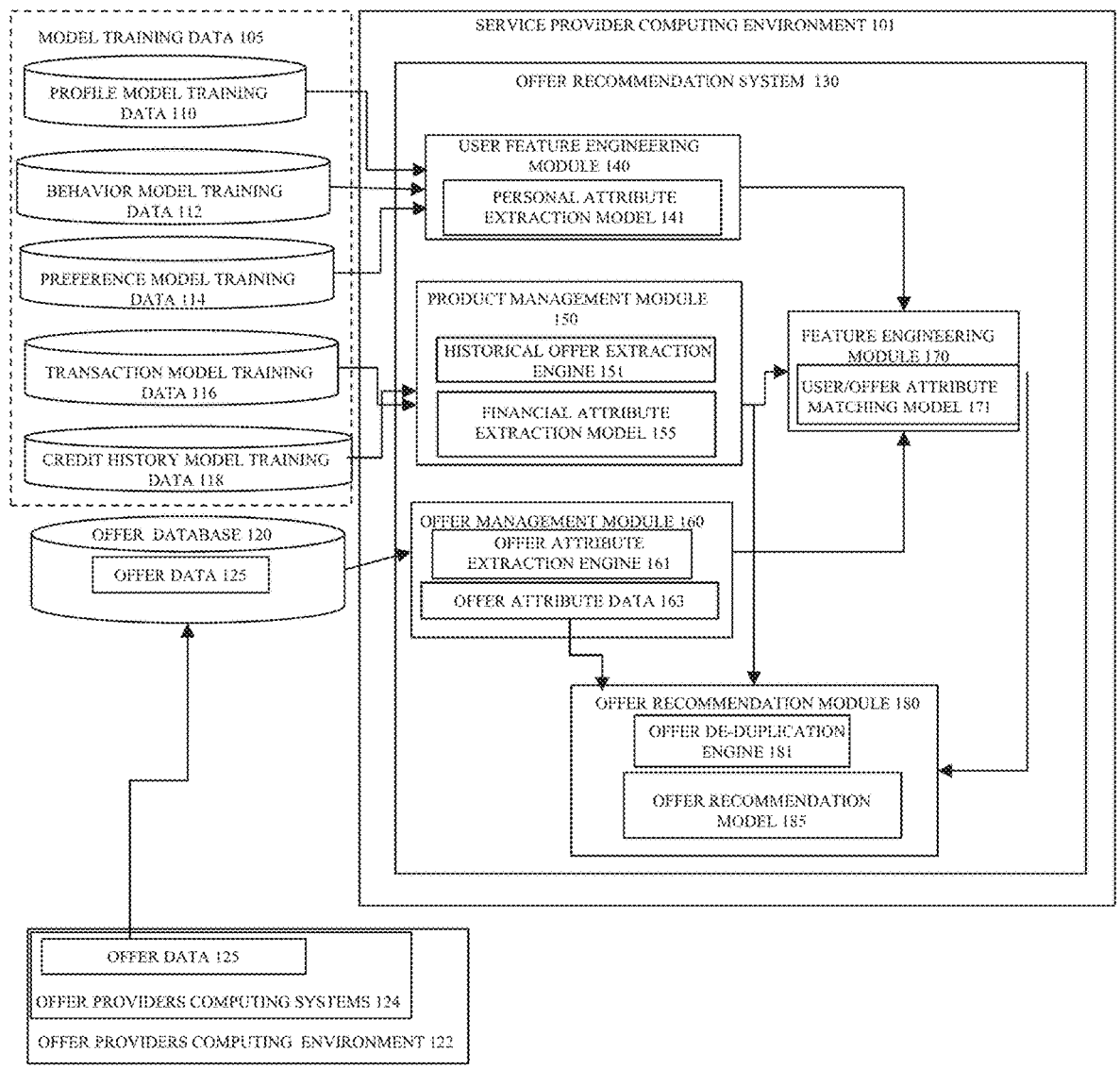
FIG. 1 is a functional block diagram of a training environment for implementing offline model training of a method and system for using machine learning techniques to make highly relevant and de-duplicated offer recommendations, in accordance with one embodiment.

Implementations of the subject matter disclosed herein will now be discussed with reference to the accompanying Figures. Various aspects of the subject matter disclosed herein can be implemented in many different forms and should not be construed as limited to the embodiments set forth herein, shown in the Figures, and/or described below. Rather, these exemplary embodiments are provided to allow a complete disclosure that conveys the principles of the invention, as set forth in the claims, to those of skill in the art.

As used herein, a data management system can be, but is not limited to, any system or application implemented on a computing system, accessed through one or more servers, a network, a cloud, and/or provided through any system whether known in the art at the time of filing or developed after the time of filing, that can implement machine learning techniques to provide offer recommendations that may be more relevant and contain less duplicate information that conventional system.

As used herein, a financial management system can be, but is not limited to, any data management system implemented on a computing system, accessed through one or more servers, accessed through a network, accessed through a cloud, and/or provided through any system or by any means, as discussed herein, and/or as known in the art at the time of filing, and/or as developed after the time of filing, that gathers financial data, including financial transactional data, from one or more sources and/or has the capability to analyze and categorize at least part of the financial data.

As used herein, the term financial management system includes, but is not limited to the following: computing system implemented, and/or online, and/or web-based, personal and/or business financial management systems, services, packages, programs, modules, or applications; computing system implemented, and/or online, and/or web-based, personal and/or business tax preparation systems, services, packages, programs, modules, or applications; computing system implemented, and/or online, and/or web-based, personal and/or business accounting and/or invoicing systems, services, packages, programs, modules, or applications; and various other personal and/or business electronic data management systems, services, packages, programs, modules, or applications, whether known at the time of filling or as developed later.

Specific examples of financial management systems include, but are not limited to the following: QuickBooks™, available from Intuit, Inc. of Mountain View, Calif.; QuickBooks On-Line™, available from Intuit, Inc. of Mountain View, Calif.; QuickBooks Self-Employed available from Intuit, Inc. of Mountain View, Calif.; Mint™, available from Intuit, Inc. of Mountain View, Calif.; Mint On-Line™, available from Intuit, Inc. of Mountain View, Calif.; TurboTax™, available from Intuit, Inc. of Mountain View, Calif., and/or various other financial management systems discussed herein, and/or known to those of skill in the art at the time of filing, and/or as developed after the time of filing.

As used herein, the terms "computing system," "computing device," and "computing entity," include, but are not limited to, the following: a server computing system; a workstation; a desktop computing system; a mobile computing system, including, but not limited to, smart phones, portable devices, and/or devices worn or carried by a user; a database system or storage cluster; a virtual asset; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms "computing system" and "computing entity," can denote, but are not limited to, the following: systems made up of multiple virtual assets, server computing systems, workstations, desktop computing systems, mobile computing systems, database systems or storage clusters, switching systems, routers, hardware systems, communications systems, proxy systems, gateway systems, firewall systems, load balancing systems, or any devices that can be used to perform the processes and/or operations as described herein.

As used herein, the terms "mobile computing system" and "mobile device" are used interchangeably and include, but are not limited to the following: a smart phone; a cellular phone; a digital wireless telephone; a tablet computing system; a notebook computing system; any portable computing system; a two-way pager; a Personal Digital Assistant (PDA); a media player; an Internet appliance; devices worn or carried by a user; or any other movable/mobile device and/or computing system that includes components that can execute all, or part, of any one of the processes and/or operations as described herein.

As used herein, the term "production environment" includes the various components, or assets, used to deploy, implement, access, and use, a given application as that application is intended to be used. In various embodiments, production environments include multiple computing systems and/or assets that are combined, communicatively coupled, virtually and/or physically connected, and/or associated with one another, to provide the production environment implementing the application.

As specific illustrative examples, the assets making up a given production environment can include, but are not limited to, the following: one or more computing environments used to implement the application in the production environment such as a data center, a cloud computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; and/or any other assets/components making up an actual production environment in which an application is deployed, implemented, accessed, and run, e.g., operated, as discussed herein, and/or as known in the art at the time of filing, and/or as developed after the time of filing.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. The hardware systems can employ processing logic that includes one or more processors, microprocessors, multi-core processors, and/or Field Programmable Gate Arrays (FPGAs) to execute operations disclosed herein. One or more memory (volatile and/or non-volatile) can be communicatively coupled to the processing logic to store instructions to execute operations and/or store data. Typically, computing environments are either known, "trusted" environments or unknown, "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate an application. Also, one or more cloud computing environments are used to create, and/or deploy, and/or operate an application that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given application or service can utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, the following: virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In some implementations, any, or all, of the assets making up a given production environment discussed herein, and/or as known in the art at the time of filing, and/or as developed after the time of filing can be implemented as one or more virtual assets. In other implementations, two or more assets, such as computing systems and/or virtual assets, and/or two or more computing environments are connected by one or more communications channels including but not limited to, Secure Sockets Layer (SSL) communications channels and various other secure communications channels, and/or distributed computing system networks, such as, but not limited to the following: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, the following: a peer-to-peer network; a hybrid peer-to-peer network; a Local Area Network (LAN); a Wide Area Network (WAN); a public network, such as the Internet; a private network; a cellular network; any general network, communications network, or general network/ communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the terms "user," "user/consumer," and "consumer" are used interchangeably and include, but are not limited to, any party, parties, entity, or entities receiving offers and/or using, or otherwise interacting with any of the methods or systems discussed herein. For instance, in various embodiments, a user can be, but is not limited to, a person, a commercial entity, an application, a service, or a computing system.

As used herein, the term "user experience" includes not only the data entry process, but also other user experience features provided or displayed to the user such as, but not limited to the following: interfaces; images; backgrounds; avatars; highlighting mechanisms; icons; and any other features that individually, or in combination, create a user experience, as discussed herein, and/or as known in the art at the time of filing, and/or as developed after the time of filing.

As used herein, the term "Artificial Intelligence (AI)" includes any method, process, system, or mechanism through which a machine interacts with the world around it, mimics human behavior, or perform tasks as if it were human, using software and/or hardware components. As used herein, the term "Machine Learning (ML)" includes any form of AI that relies on "learning" and uses one or more algorithms to analyze data, recognize patterns among the data, and make predictions without requiring a person to program specific instructions into software.

As used herein, the term "model" includes any system, module, or function that is trained using machine learning or other artificial intelligence methods, as discussed herein, and/or as known in the art at the time of filing, and/or as developed after the time of filing. As used herein, the term "engine" includes any system, module, or process that drives a function such as identification, extraction, mapping, correlation, or any other operation that does not necessarily, but can, require machine learning methods. In some instances, the terms "model" and "engine" are interchangeable.

Overview

Implementations of the subject matter disclosed herein can use big data analysis and machine learning methods to provide offer recommendations that are determined to be relevant to a given user. In some implementations, machine learning based matching of user attributes and offer attributes is performed to identify potentially relevant offers for a given user. A de-duplication process is then used to filter out offers that the user has already seen, has historically shown no interest in, has already accepted, that are directed to product or service types the user already owns or does not qualify, or that are otherwise deemed to be irrelevant to the user. In this way, using the disclosed embodiments, only offers that are relevant to a given user are recommended to that user.

This is an important advantage because, as a specific illustrative example, many software applications and systems, such as data management systems, are used as platforms to disseminate offers associated with the subject matter and/or services provided by the software application and systems. In some cases, this arrangement makes sense because the offers are typically at least tangentially related to the subject matter of the software applications and systems. However, it is equally true that if a user, and particularly a paying customer/user, of the platform software application or system becomes annoyed with offers being provided through the software application or system, the user is likely to blame the software application or system provider. In some cases, this can lead to the annoyed user abandoning the platform software application or system, or at least becoming a less satisfied customer. Consequently, it is critical for user satisfaction and delight that offers provided to a user of a software application or system actually be of interest, and relevant, to the user.

As one specific illustrative example, in one or more implementations, the offers are financial service and product offers related to financial services and products, such as, but not limited to: credit cards, bank accounts, lines of credit, business loans, personal loans, car loans, home loans, home refinancing loans, home equity loans, retirement or investment programs, government financial aid or grant programs, private financial aid or grant programs, debt consolidation services, accounting services, certificate of deposit accounts, government bonds, electronic currency investment accounts, or any other financial service or product offers, as discussed herein, and/or as known in the art at the time of filing, and/or as developed after the time of filing.

In this one illustrative example, it may be desirable to make the users of a financial management system aware of financial services and product offers via the financial management system used by the users, such as any of the financial management systems discussed herein, and/or as known in the art at the time of filing, and/or as developed after the time of filing. This is because providers of financial management systems often desire to provide their users a wide range of services and features customized to the user's particular financial situation. This, in turn, may increase customer loyalty and satisfaction. One way a provider of a financial management system can provide customized and relevant service to a user is to recommend the best and most personalized financial service and product related offers to the user.

As discussed above, there is an inherent risk to the provider of the financial management system when using their financial management system as a platform to disseminate financial service and product related offers, even when the offers are directly related the subject matter and/or services provided by the financial management system. This is because while it arguably makes sense to provide financial services and product related offers that are related to the subject matter of the financial management system, it is equally true that if a user, and particularly a paying user, of the platform financial management system becomes annoyed with offers being provided through the financial management system, the user is likely to blame the financial management system provider. In some cases, this can lead to the annoyed user abandoning the financial management system, or at least becoming a less satisfied user. Consequently, it is critical that offers provided to a user of a financial management system, through that financial management system, actually be of interest, of value, and relevant, to the user. Thus, while the implementations disclosed herein are applicable to all forms of offers, providers of financial management systems, financial management system users, and providers of financial services and product related offers, are particularly likely to significantly benefit from the implementation of the embodiments disclosed herein.

In some implementations, big data analysis methods are used to access and process multiple sources of user data, including, but not limited to, one or more of profile data, behavior data, preference data, transaction data, and credit history data associated with two or more users/consumers, and, in various embodiments, millions, tens of millions, or hundreds of millions, of users/consumers. The user data can be processed and labeled to transform the user data into model training data, which can be used to train one or more user attribute extraction models for identifying and extracting user attributes such as personal attributes and financial attributes.

The model training data can also be used to generate and train one or more user/offer attribute matching models used to correlate the various user attributes to offer attributes on a user attribute/offer attribute pair basis. In some aspects, the model training data is used to train an offer recommendation model to identify one or more potential offers to be recommended to particular users. Once the machine learning models are trained using the model training data, runtime execution of the method and system for using machine learning techniques to make highly relevant and de-duplicated offer recommendations is performed using a given user's data. To this end, the user's profile data, behavior data, preference data, transaction data, and credit history data for a given user is obtained.

The user's profile data, behavior data, and preference data are used by a user feature engineering module, including a personal attribute extraction model, to generate personal attribute data for the user. In some instances, the user feature engineering module can include a personal attribute extraction model. The user's transaction data and credit history data are used by a product management module, including an historical offer extraction engine and a financial attribute extraction model, to generate historical offer data and financial attribute data for the user.

Current offer data representing one or more current offers associated with one or more products is accessed and processed by a current offer attribute extraction engine of an offer management module to identify and extract offer attribute data representing various offer attributes.

The user's attribute data (such as the user's personal attribute data and the financial attribute data) and the current offer attribute data are used by a feature engineering module, including the user/offer attribute matching model, to generate user/offer attribute matching data representing matched offer attributes for the user.

The user's historical offer data and current offer attribute data are used by an offer de-duplication engine to de-duplicate any offers included in the current offers that the user has already seen, has historically shown no interest in, has already accepted, that are directed to product or service types the user/consumer already owns, for which the user does not qualify, or that are otherwise deemed to be irrelevant to the user. In one embodiment, the de-duplication engine output is de-duplicated offer data for the user.

The user/offer attribute matching data and the de-duplicated offer data are then used by the offer recommendation model to generate offer recommendation data representing one or more recommended offers for the user.

The recommended offers for the user are ranked in the offer recommendation data according to various factors including, but not limited to, the weighted or non-weighted matching level of the user and offer attributes, and/or any other indicated parameters. In some implementations, the analysis parameters, features, assumptions, and/or processes used to perform the ranking of the recommended offers can be included in the offer recommendation data provided to the user. In some instances, the offer recommendation data includes a score or ranking indicating the likelihood of the user successfully obtaining the product or service that is the subject of the recommended offers and, in one embodiment, key factors and considerations used in the calculations.

As described in more detail below, implementations of the subject matter disclosed herein provide a technical solution to the long-standing technical problem in the offer distribution arts of ensuring only offers that are relevant to a given consumer are recommended to that consumer. In addition, the disclosed embodiments provide a technical solution to the Internet-based aggravation of the need for a technical solution to the problem of recommending only relevant offers brought on by virtue of the Internet being used as a platform for the large scale, and relatively inexpensive, distribution of electronic media based offers.

Consequently, the present disclosure provides highly efficient, effective, and versatile methods and systems for providing de-duplicated and user customized offer recommendation data to a user. However, the disclosed subject matter does not encompass, embody, or preclude other forms of innovation in the area of offer recommendation and customization. Nor does the subject matter disclosed herein represent an abstract idea for at least a few reasons. First, obtaining model training data from multiple sources, using big data analysis, machine learning, and artificial intelligence to generate models to match user/offer attribute pairs, using NLP and various algorithms to extract historical offer data, and executing the various models and engines on user data to provide highly relevant and de-duplicated offer recommendations to consumers is not an abstract idea because it is not merely an idea itself (e.g., cannot be performed mentally or using pen and paper).

In contrast, the various implementations disclosed herein require the use of special training data, such as, but not limited to, profile data, behavior data, preference data, transaction data, credit history data, and offer data for two or more, and, in various embodiments, millions, tens of millions, or hundreds of millions of, users and/or offers, obtained from one or more data sources, such as, but not limited to, one or more data management systems, such as one or more financial management systems. In addition, the various implementations disclosed herein can include the use of machine learning methods to generate and train multiple models, including but not limited to, a personal attribute extraction model, a financial attribute extraction model, a user/offer attribute matching model, and an offer recommendation model, along with several data engines, including but not limited to, an historical offer extraction engine, a current offer attribute extraction engine, an offer de-duplication engine, and various other data processing algorithms. In fact, some of the disclosed embodiments include creating, and in some embodiments labeling, special model training data sets, developing, applying, and dynamically modifying one or more analytics models using supervised, and/or unsupervised, and/or semi-supervised training processes, and the application of artificial intelligence and structured and/or unstructured user feedback; none of which can be performed mentally or with pen and paper alone.

Second, obtaining model training data from multiple sources, using big data analysis, machine learning, and artificial intelligence to generate models to match user/offer attribute pairs, using NLP and various algorithms to extract historical offer data, and executing the various models and engines on user data to provide highly relevant and de-duplicated offer recommendations to consumers is not an abstract idea because it is not a fundamental economic practice (e.g., is not merely creating a contractual relationship, hedging, mitigating a settlement risk, etc.).

Third, obtaining model training data from multiple sources, using big data analysis, machine learning, and artificial intelligence to generate models to match user/offer attribute pairs, using NLP and various algorithms to extract historical offer data, and executing the various models and engines on user data to provide highly relevant and de-duplicated offer recommendations to consumers is not an abstract idea because it is not a method of organizing human activity (e.g., managing a game of bingo).

Further, obtaining model training data from multiple sources, and using big data analysis, machine learning, and artificial intelligence to generate models to match user/offer attribute pairs, and using NLP and various algorithms to extract historical offer data, and executing the various models and engines on user data to provide highly relevant and de-duplicated offer recommendations to consumers represents an ordered combination of elements and operations that adds significantly to the fields of data management, resource management, data distribution management. As such, the amount of memory required for the processing and storage of data, the bandwidth required to transfer data, and amount of data processing cycles utilized can be reduced significantly. As a result, implementations of the subject matter described in this disclosure can be used to reduce use of processor cycles, processor power, communications bandwidth, memory usage, and power consumption. Consequently, computing and communication systems implementing or providing the embodiments of the present disclosure are transformed into more operationally efficient devices and systems.

In addition to improving overall computing performance, obtaining model training data from multiple sources, using big data analysis, machine learning, and artificial intelligence to generate models to match user/offer attribute pairs, using NLP and various algorithms to extract historical offer data, and executing the various models and engines on user data to provide highly relevant and de-duplicated offer recommendations to consumers represents an ordered combination of elements and operations that allows for more efficient use of both human and non-human resources as offers so generated are fewer, better targeted, and more likely to be relevant, accepted, and utilized. As a result, computing systems are further transformed into faster, more efficient, and more effective computing systems by implementing the methods and systems disclosed herein.

In addition, the subject matter disclosed herein addresses a technically need that is at least aggravated, if not originated, by the use of the Internet as a platform for widely distributing offers relatively cheaply. As such, the disclosed implementations provide a technical solution to address a technical problem associated with the Internet.

Exemplary Training and Runtime Environments

One or more implementations of the subject matter disclosed herein can leverage model training data derived from user data obtained from multiple sources. In some aspects, offers information can be obtained from one or more offer providers. Specifically, one or more machine learning based attribute extraction models are trained using the model training data, and then executed to extract user attributes and offer attributes. In some instances, one or more machine learning based user/offer matching models are then trained and executed using the model training data to match the user attributes and offer attributes to each other, and, in one embodiment, to other defined attributes.

Natural Language Processing (NLP), or similar text identification and processing techniques, can be used to analyze user transaction and credit history data, and to extract and process portions of the user transaction and credit history data to generate user historical offer data. The user historical offer data can indicate offers that the user has already seen, has already accepted, or has ignored, and can be processed by an offer de-duplication engine to identify and eliminate any offers that the user has already seen, has historically shown no interest in, has already accepted, that are directed to product or service types the user/consumer already owns, for which the user does not qualify, or that are otherwise deemed to be irrelevant to the user. The one or more machine learning based recommendation models are then trained and executed to make offer recommendations to the user that are determined to be relevant to the user, and/or for which the user is likely to qualify.

As such, implementations of the subject matter described in this disclosure employ one or more machine learning processes and models to provide a technical solution to the long-standing technical problem in the electronic offer distribution arts of ensuring only offers that are relevant to a given consumer are recommended to that consumer. To this end, offline model training is performed prior to executing a runtime model and making offer recommendations for a particular, i.e., given, user.

Figure 2:
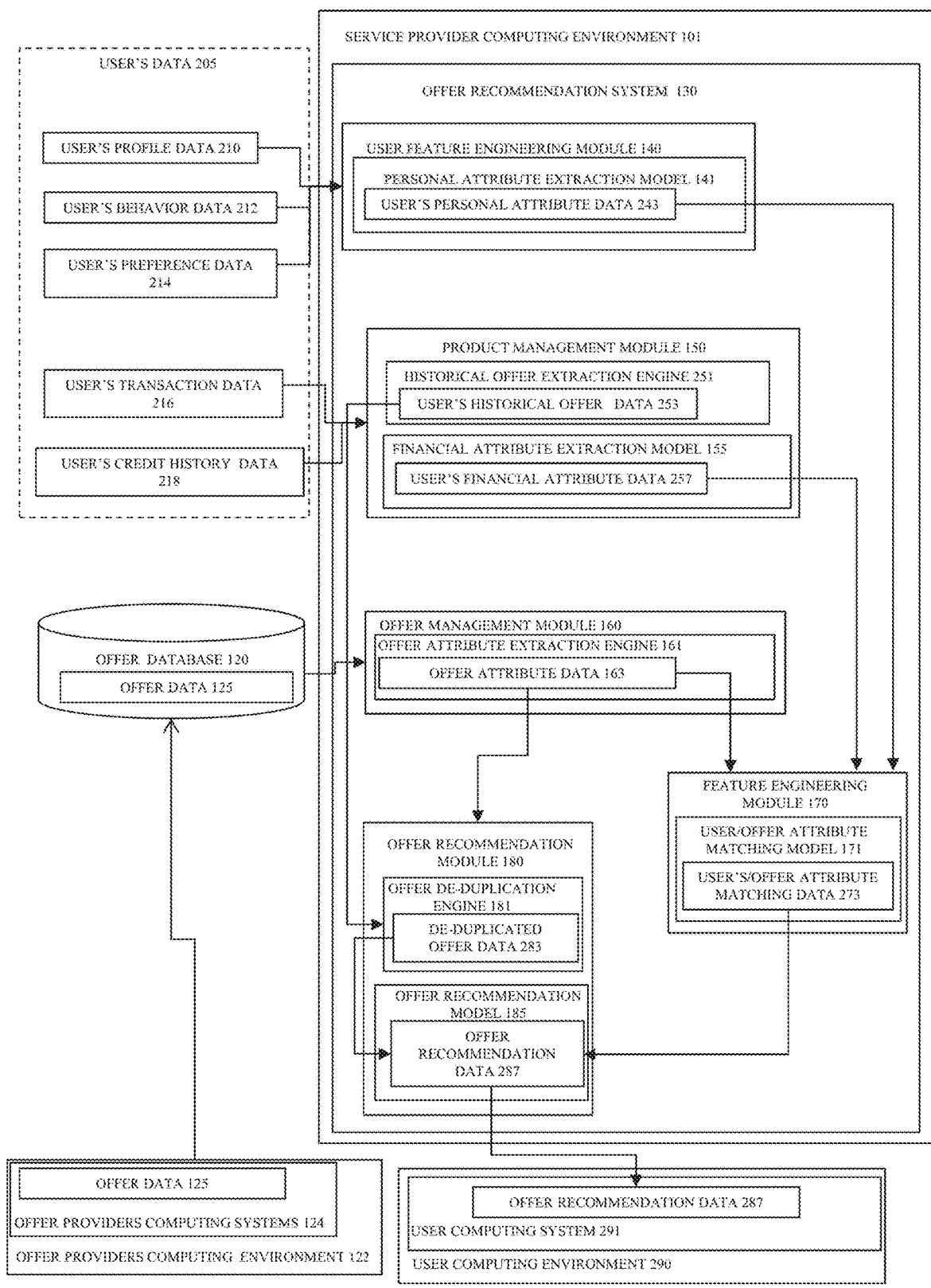
FIG. 2 is a functional block diagram of a runtime environment for implementing runtime execution of a method and system for using machine learning techniques to make highly relevant and de-duplicated offer recommendations, in accordance with one embodiment.

FIG. 1 shows a functional block diagram of an example training environment 100A that may be used for offline training of modules and models that implement a method and system for using machine learning techniques to make highly relevant and de-duplicated offer recommendations. FIG. 2 shows a functional block diagram of a runtime environment 100B that may be use machine learning techniques to make highly relevant and de-duplicated offer recommendations. In some implementations, the training environment 100A of FIG. 1 and the runtime environment 100B of FIG. 2 can include a service provider computing environment 101, an offer providers computing environment 122, and an offer database 120. The service provider computing environment 101 can include an offer recommendation system 130. The offer providers computing environment 122 can include offer providers computing systems 124 that generate or provide offer data 125. The offer database 120 can receive offer data 125 from the offer providers computing systems 124. In some instances, the training environment 100A can include profile model training data 110, behavior model training data 112, preference model training data 114, transaction model training data 116, and credit history model training data 118.

In some implementations, big data analysis methods are used to access and process multiple sources of user data, and to obtain raw user data (not shown) associated with any number of users. In some instances, raw user data can be obtained from a relatively smaller number of users (such as less than 10). In other instances, raw user data can be obtained from a larger group of users (such as thousands of users). In some other instances, raw user data can be obtained from a relatively large number of users (such as millions or tens of millions of users). The user data includes, but is not limited to, one or more of, raw profile data (not shown), raw behavior data (not shown), raw preference data (not shown), raw transaction data (not shown), and raw credit history data (not shown) associated with the two or more, and, in various embodiments, millions, tens of millions, or hundreds of millions of, users.

The raw profile data portion of the user data includes, but is not limited to, demographics data, age data, location data, employment data, income data, debt load data, savings data, and/or any other profile data indicating a grouping or status of the users as discussed herein, and/or as known in the art of the time of filing, and/or as developed after the time of filing. In some aspects, the profile data is associated with two or more, and, in various embodiments, millions, tens of millions, or hundreds of millions of, users. The raw profile data is obtained, at least in part, from, or through, one or more data management systems, such as, but not limited to, one or more financial management systems (not shown).

The raw behavior data portion of the user data includes, but is not limited to, data indicating: whether the users are spenders or savers; whether the users travel; whether the users are borrowers and, if so, what type of borrowers; where the users shop and the type of shop the users frequent; the types of expenses the users incur; and/or any other behavior data indicating traits or behaviors associated with users, as discussed herein, and/or as known in the art at the time of filing, and/or as developed, or becomes available, after the time of filing. In addition, in one embodiment, the raw behavior data portion of the user data includes, but is not limited to, click stream and engagement data indicating the users' activity within, and level of use of, one or more data management systems, the users' types of activity and how they use one or more data management systems, length of time the users use one or more data management systems, viewing, engagement and use of financial offers, and/or any other data indicating the users engagement with computers, applications, websites, the Internet, or any other networking technology, as discussed herein, and/or as known in the art at the time of filing, and/or as developed, or becomes available, after the time of filing. In some implementations, the raw behavior data is associated with at least two or more, and, in various embodiments, millions, tens of millions, or hundreds of millions of, users. In some aspects, the behavior data is obtained, at least in part, from, or through, one or more data management systems, such as, but not limited to, one or more financial management systems (not shown).

The raw preference data portion of the user data can include, but is not limited to: data indicating providers, such as banks and financial institutions, associated with the users; data indicating the types of rewards such as cashback, travel points, annual percentage rates, preferred by the users; data indicating the users' tastes or style; and/or any other preference data indicating various preferences or leanings associated with the users, as discussed herein, and/or as known in the art at the time of filing, and/or as developed/made available after the time of filing. In some implementations, the raw preference data is associated with two or more, and, in various embodiments, millions, tens of millions, or hundreds of millions of, users. In some aspects, the raw preference data is obtained, at least in part, from, or through, one or more data management systems, such as, but not limited to, one or more financial management systems (not shown).

The raw transaction data portion of the user data includes, but is not limited to, data indicating historical transaction amounts, payees, and locations, recurrence and/or frequency of transactions, withdrawals, mortgage/rent payments, credit card payments, charitable contributions, alimony or child support payments, expense transactions, income transactions, insurance payments, and/or any transaction data as discussed herein, and/or as known in the art at the time of filing, and/or as developed, or becomes available, after the time of filing. In some implementations, the raw transaction data is associated with two or more, and, in various embodiments, millions, tens of millions, or hundreds of millions of, users. In some aspects, the raw transaction data is obtained, at least in part, from, or through, one or more data management systems, such as, but not limited to, one or more financial management systems (not shown).

The raw credit history data portion of the user data includes, but is not limited to: credit card account data such as, but not limited to, account names and account holder names, balance data, status data, open and close date data, payment history data, and credit limit data; loan/mortgage data such as, but not limited to, initial mortgage/loan amount data and balance data, mortgage/loan term data, mortgage/loan payment history data, mortgage/loan status data, mortgage/loan interest rate, and mortgage/loan type data; current and historical credit scores; debt to income ratio data; savings, checking, and overdraft account balances; personal information such as, but not limited to, names, addresses, birth dates, marital status, phone numbers, employer and employment history; and/or any other credit and financial situational data indicating the credit and financial position of the users, as discussed herein, and/or as known in the art at the time of filing, and/or as developed or made available after the time of filing. In some implementations, the raw credit history data is associated with two or more, and, in various embodiments, millions, tens of millions, or hundreds of millions of, users. In some aspects, the raw credit history data is obtained, at least in part, from, or through, one or more data management systems, such as, but not limited to, one or more financial management systems (not shown).

In some implementations, all the user data including (but not limited to) the raw profile data, the raw behavior data, the raw preference data, the raw transaction data, and the raw credit history data is sanitized to remove all data, such as Personal Identification Data (PID), that could be used to identify any individual user, directly or indirectly, access an individual user's data or accounts, or otherwise reveal personal information about a specific user. Once access to the user data is obtained, the user data can be parsed, analyzed, labeled, formatted, and/or otherwise processed to transform the user data into model training data 105. The model training data 105 can include (but is not limited to) profile model training data 110, behavior model training data 112, preference model training data 114, transaction model training data 116, and credit history model training data 118. Respective portions of the model training data are then used to train various models of operational modules used for implementing the disclosed methods and systems for using machine learning techniques to make highly relevant and de-duplicated offer recommendations to users.

In some implementations, the operational modules and models of the offer recommendation system 130 can include (but are not limited to) a user feature engineering module 140, including a personal attribute extraction model 141; a product management module 150, including an historical offer extraction engine 151 and a financial attribute extraction model 155; an offer management module 160, including an offer attribute extraction engine 161; a feature engineering module 170, including a user/offer attribute matching model 171; and an offer recommendation module 180, including an offer de-duplication engine 181 and an offer recommendation model 185.

In some instances, respective portions of the model training data 105 and/or the historical and current offer data 125 can be used to train one or more of the personal attribute extraction model 141, the financial attribute extraction model 155, the user/offer attribute matching model 171, and the offer recommendation model 185 using one or more machine leaning, or other artificial intelligence, methods prior to making specific offer recommendations to users, i.e., the models are trained "offline" prior to "runtime execution."

In some implementations, one or more portions of the model training data 105 (such as the profile model training data 110, the behavior model training data 112, and the preference model training data 114) can be used to develop and train the personal attribute extraction model 141 of the user feature engineering module 140 using machine learning methods. The personal attribute extraction model 141 can be used for identifying and extracting various personal attributes associated with any number of users (such as a few users or tens or hundreds of millions of users.

The personal attribute extraction model 141 may receive input data from one or more of the profile model training data 110, the behavior model training data 112, or the preference model training data 114 as. In some aspects, personal attributes such as age group, income group, general user characteristics, user health, user education, user employment, user residence area, user financial preferences, and/or user financial behavior can be identified and used as labels for training the personal attribute extraction model 141.

In some implementations, a supervised predictive model, such as a multiclass Support Vector Machine ($SVM^{multiclass}$) and decision tree model, can use these inputs and labels to train the personal attribute extraction model 141. In other implementations, other predictive models such as (but not limited to) Neural Network, Deep Neural Network, Logistic regression, Random forest, boosted trees, and/or any other supervised, unsupervised, or semi-supervised model can be used as the personal attribute extraction model 141.

FIG. 3A is an illustrative example of a supervised machine learning training data structure 300 for training a personal attribute extraction model of a user feature engineering module. As shown, user profile data (such as user age data) and user behavior data (such as user credit score data, event ID data associated with click stream data, and time lapse data) can be provided as input data (x) 301. The user attribute data (indicating information such as whether the user is a spender or a financial data tracker) as used as labels (y) 303, to train the personal attribute extraction model.

The model training data 105, which can include one or more of the transaction model training data 116 and the credit history model training data 118, may be used along with machine learning methods to develop and train the financial attribute extraction model 155 to identify and extract various financial attributes associated with any suitable number of users.

The financial attribute extraction model 155 may be trained to extract any financial attribute data from the transaction data and credit history data such as, but not limited to, financial attribute data indicating historical transaction amounts, payees, and locations, recurrence and/or frequency of transactions, withdrawals, mortgage/rent payments, credit card payments, charitable contributions, alimony or child support payments, expenses, income, insurance payments; credit card account data such as, but not limited to, account names and account holder names, balance data, status data, open and close date data, payment history data, and credit limit data; loan/mortgage data such as, but not limited to, initial mortgage/loan amount data and balance data, mortgage/loan term data, mortgage/loan payment history data, mortgage/loan status data, mortgage/loan interest rate, and mortgage/loan type data; current and historical credit scores; debt to income ratio data; savings, checking, and overdraft account balances; personal information such as, but not limited to, names, addresses, birth dates, marital status, phone numbers, employer and employment history; spending characteristics of the users, merchants used, types of purchases, products and services recently or historically purchased, general financial health, general financial characteristics, and/or any other user's financial attributes, as discussed herein, and/or as known in the art at the time of filing, and/or as become known after the time of filing.

In some implementations, a predictive model may be trained and used as financial attribute extraction model 155. In various embodiments, predictive models, such as, but not limited to Neural Network, Deep Neural Network, Logistic regression, Random forest, boosted trees, and/or any other supervised, unsupervised, or semi supervised model, as discussed herein, and/or as known or available in the art at the time of filing, and/or as is developed or comes available after the time of filing is used as financial attribute extraction model 155.

In some implementations, offer data 125 (such as current offer data and historical offer data) can be obtained directly or indirectly by one or more providers of products and/or services via the offer providers computing systems 124 of the offer providers computing environment 122 and is stored in database, such as offer database 120. In some instances, the offer data 125 is accessed by the offer management module 160 to identify and extract offer attribute data, such as offer attribute data 163, including current and/or historical offer attribute data representing various offer attributes.

The offer attribute data can include (but is not limited to) data indicating: the names of providers, such as financial institutions, associated with the offers; categories of the providers, such as financial institutions, associated with the offers; terms of the offers; rewards or loyalty programs associated with the offers; approval criteria and/or acceptance rates associated with the offers. In some implementations, the offer attribute data includes any other offer attribute data indicating the nature, requirements, operation, or structure of the offers as discussed herein, and/or as known in the art at the time of filing, and/or as developed or made available after the time of filing.

In some implementations, the user attribute data and offer attribute data for multiple, and, in various embodiments, millions, tens of millions, or hundreds of millions of, users and/or offers is processed and labeled for use as model training data for the user/offer attribute matching model 171 of the feature engineering module 170. In one embodiment, the user attribute data and offer attribute data are used to generate and train one or more machine learning based user/offer attribute matching models 171 to correlate the various user attributes to offer attributes, in one embodiment on a user attribute/offer attribute pair basis.

The user/offer attribute matching model 171 uses user attribute and offer attribute pairs as inputs and portions of one or more of the profile model training data, preference model training data, and behavior model data as labels to train a mapping model such as a logistic regression model. In some implementations, the user/offer attribute matching model 171 is any other mapping model as discussed herein, and/or as known or available in the art at the time of filing, and/or as is developed or comes available after the time of filing.

FIG. 3B is an illustrative example of a machine learning data structure 310 for training a user/offer attribute matching model of a feature engineering module, in accordance with one embodiment. As seen in FIG. 3B, user attribute data 311 including user age data and user credit score data are matched to an offer attribute data 313 that indicates offer provider data, type of offer data, and rewards data. In the specific illustrative example of FIG. 3B, a user usage value 315 of 1 indicates a user attribute/off attribute match and a user usage value of 0 indicates a user attribute/off attribute non-match.

Portions the model training data 105 are used to generate and train the offer recommendation model 185 of the offer recommendation module 180 using machine learning methods. In some instances, the outputs of the product management module 150 and the offer management module 160 are used as inputs to the offer recommendation model 185. In other instances, the offer recommendation model 185 uses each pair of matched user/offer attributes (not shown in FIG. 1) as input and portions of the profile model training data, the preference model training data, and the behavior model training data as labels for a mapping model, such as a logistic regression model, or any other nonlinear regression model. In addition, or in the alternative, the offer recommendation model 185 can be any other mapping model as discussed herein, and/or as known or available in the art at the time of filing, and/or as is developed or comes available after the time of filing.

Referring to FIG. 2, once the various modules and models are generated and trained using the respective portion of the model training data as discussed above with respect to FIG. 1, the runtime model is executed for a specific user.

The runtime environment 100B includes service provider computing environment 101 and offer recommendation system 130. In some instances, user's data 205 associated with the given user is obtained. The user's data 205 may be data associated with the given user and can include user's profile data 210, user's behavior data 212, user's preference data 214, user's transaction data 216, and user's credit history data 218 for the given user that is obtained from any one or more of the sources of profile data, behavior data, preference data, transaction data, and credit history data discussed herein with respect to FIG. 1, and/or as known in the art at the time of filing, and/or as become known after the time of filing.

A user's profile data 210 includes (but is not limited to) one or more of demographics data, age data, location data, employment data, income data, debt load data, savings data, and/or any other profile data indicating a grouping or status of the users as discussed herein, and/or as known in the art of the time of filing, and/or as developed after the time of filing.

A user's behavior data 212 includes (but is not limited to) one or more of data indicating: whether the user is a spender or saver; whether the user travels; whether the user is a borrower and, if so, what type of borrower; where the user shops and the type of shops the user frequents; the types of expenses the user incurs; and/or any other behavior data indicating traits or behaviors associated with the user, as discussed herein, and/or as known in the art at the time of filing, and/or as developed, or becomes available, after the time of filing. In addition, in one embodiment, the user behavior data includes, but is not limited to, click stream and engagement data indicating the user's activity within, and level of use of, one or more data management systems, the user's types of activity and how the user uses one or more data management systems, length of time the user uses one or more data management systems, views, engages, and makes use of financial offers, and/or any other data indicating the user's engagement with computers, applications, websites, the Internet, or any other networking technology, as discussed herein, and/or as known in the art at the time of filing, and/or as developed, or becomes available, after the time of filing.

A user's preference data 214 includes (but is not limited to) one or more of data indicating providers, such as banks and financial institutions, associated with the user; data indicating the types of rewards such as cashback, travel points, annual percentage rates, preferred by the user; data indicating the user's tastes or style; and/or any other preference data indicating various preferences or leanings associated with the user, as discussed herein, and/or as known in the art at the time of filing, and/or as developed/made available after the time of filing.

A user's transaction data 216 includes (but is not limited to) one or more of data indicating historical transaction amounts, payees, and locations, recurrence and/or frequency of transactions, withdrawals, mortgage/rent payments, credit card payments, charitable contributions, alimony or child support payments, expense transactions, income transactions, insurance payments, and/or any transaction data as discussed herein, and/or as known in the art at the time of filing, and/or as developed, or becomes available, after the time of filing.

A user's credit history data 218 includes (but is not limited to) one or more of credit card account data such as, but not limited to, account names and account holder names, balance data, status data, open and close date data, payment history data, and credit limit data; loan/mortgage data such as, but not limited to, initial mortgage/loan amount data and balance data, mortgage/loan term data, mortgage/loan payment history data, mortgage/loan status data, mortgage/loan interest rate, and mortgage/loan type data; current and historical credit scores; debt to income ratio data; savings, checking, and overdraft account balances; personal information such as, but not limited to, names, addresses, birth dates, marital status, phone numbers, employer and employment history; and/or any other credit and financial situational data indicating the credit and financial position of the user, as discussed herein, and/or as known in the art at the time of filing, and/or as developed or made available after the time of filing.

Referring back to FIG. 2, in one embodiment, the user feature engineering module 140 is executed. In some instances, the user's profile data 210, user's behavior data 212, and user's preference data 214 are used by the personal attribute extraction model 141 of the user feature engineering module 140 to generate user's personal attribute data 243 for the user.

The user's personal attribute data 243 represents various user attributes such as (but not limited to) age group, income group, general user characteristics, user health, user education, user employment, user residence area, user financial preferences, user financial behavior, e.g., is the user a spender or saver, user risk tolerance, e.g., is the user financially risk tolerant or risk adverse, and/or any other personal attributes, as discussed herein, and/or as known in the art at the time of filing, and/or as become known after the time of filing.

The product management module 150 is executed. In some instances, the user's transaction data 216 and user's credit history data 218 is used by the product management module 150, including the historical offer extraction engine 251 and the financial attribute extraction model 155, to generate user's historical offer data 253 and user's financial attribute data 257, respectively.

The product management module 150 uses the financial attribute extraction model 155 to extract user's financial attribute data 257 from the user's transaction data 216 and user's credit history data 218. The user's financial attribute data represents various user's financial attributes such as (but not limited to) financial attribute data indicating historical transaction amounts, payees, and locations, recurrence and/or frequency of transactions, withdrawals, mortgage/rent payments, credit card payments, charitable contributions, alimony or child support payments, expenses, income, insurance payments; credit card account data such as, but not limited to, account names and account holder names, balance data, status data, open and close date data, payment history data, and credit limit data; loan/mortgage data such as, but not limited to, initial mortgage/loan amount data and balance data, mortgage/loan term data, mortgage/loan payment history data, mortgage/loan status data, mortgage/loan interest rate, and mortgage/loan type data; current and historical credit scores; debt to income ratio data; savings, checking, and overdraft account balances; personal information such as, but not limited to, names, addresses, birth dates, marital status, phone numbers, employer and employment history; spending characteristics of the users, merchants used, types of purchases, products and services recently or historically purchased, general financial health, general financial characteristics, and/or any other user's financial attributes, as discussed herein, and/or as known in the art at the time of filing, and/or as become known after the time of filing. As used herein, the user's personal attributes and the user's financial attributes are collectively referred to as user's attributes and the user's personal attribute data 243 and user's financial attribute data 257 are collectively referred to as user's attribute data.

The user's historical offer data 253 is obtained using the historical offer extraction engine 251 of the product management module 150. In some instances, the historical offer extraction engine 251 uses natural language processing (NLP) methods, or similar techniques, and one or more algorithms to extract user's historical offer data 253 representing historical offer information/data, such as, but not limited to, one or more of, the names of providers, such as financial institutions, associated with the historical offers; categories of the providers, such as financial institutions, associated with the historical offers; terms of the historical offers; rewards or loyalty programs associated with the historical offers; approval criteria and/or acceptance rates associated with the historical offers, data indicating what specific offers have been previously made to the user, what specific offers have been accepted, what specific offers have been declined, when historical offers were made, similar historical offers declined or accepted, products and/or services the user has purchased, or owns, that are the same or similar to the products and/or services that are the subject matter of one or more current offers, and/or any other historical offer data as discussed herein, and/or as known/available in the art at the time of filing, and/or as become known/available after the time of filing.

The offer management module 160 is executed using the offer data 125 as input data. In some instances, the offer management module 160 receives the offer data 125 representing currently available offers from the offer database 120. In one embodiment, the offer data 125 is provided to offer database 120 by offer providers computing systems 124 operating in offer providers computing environment 122. In some implementations, the offer attribute extraction engine 161 of the offer management module 160 is used to register and extract offer attribute data 163 for each of the offers represented in the offer data 125. In other implementations, the offer attribute data 163 includes, but is not limited to, data indicating: the names of providers, such as financial institutions, associated with the offers; categories of the providers, such as financial institutions, associated with the offers; terms of the offers; rewards or loyalty programs associated with the offers; approval criteria and/or acceptance rates associated with the offers. In some other implementations, the offer attribute data 163 includes any other offer attribute data indicating the nature, requirements, operation, or structure of the offers as discussed herein, and/or as known in the art at the time of filing, and/or as developed or made available after the time of filing.

The feature engineering module 170 is executed using the user's attribute data, i.e., the user's personal attribute data 243 from the user feature engineering module 140 and user's financial attribute data 257 from the product management module 150, and the offer attribute data 163 from the offer management module 160 as inputs and outputting user's/offer attribute matching data 273. As noted above, the user/offer attribute matching model 171 of the feature engineering module 170 can use user's attribute/offer attribute pairs (not shown) as inputs and portions of the user's profile data 210, the user's behavior data 212, and the user's preference data 214 as labels to train a mapping model such as a logistic regression model. In various embodiments, user/offer attribute matching model 171 is any other mapping or other predictive model, such as, but not limited to Neural Network, Deep Neural Network, Logistic regression, Random forest, boosted trees, and/or any other supervised, unsupervised, or semi supervised model, as discussed herein, and/or as known or available in the art at the time of filing, and/or as is developed or comes available after the time of filing.

In some implementations, when the user/offer attribute matching model 171 is a logistic regression model, the output of the user/offer attribute matching model 171 is a zero or a one, with zero indicating the user's attribute and the offer attribute pair are not a match, and a one indicating the user's attribute and the offer attribute pair are match. However, the output of the feature engineering module 170 is user's/offer attribute matching data 273 representing the matched user's and offer attributes.

In some instances, the offer recommendation module 180 is executed. In one embodiment, the user's/offer attribute matching data 273 from the feature engineering module 170, the offer attribute data 163 from the offer management module 160, and the user's historical offer data 253 from the product management module 150 are provided as input to the offer recommendation module 180. In one embodiment, the user's historical offer data 253 and offer attribute data 163 are used by the offer de-duplication engine 181 of the offer recommendation module 180 to de-duplicate any offers included in the offer data 125 that the user has already seen, has historically shown no interest in, has already accepted, that are directed to product or service types the user/consumer already owns, for which the user does not qualify, or that are otherwise deemed to be irrelevant to the user, and to generate de-duplicated offer data 283 representing a consolidated list of de-duplicated offers.

The user's/offer attribute matching data 273 and the de-duplicated offer data 283 are used by the offer recommendation model 185 of the offer recommendation module 180 to generate offer recommendation data 287 representing one or more recommended offers for the user. The offer recommendation data 287 is then provided to the user. In some instances, the offer recommendation data 287 is provided to the user via a user computing system 291 implemented in user computing environment 290. In other instances, the offer recommendation data 287 is provided to the user through a data management system, such as a financial management system (not shown), running on, or displayed through, the user computing system 291 implemented in user computing environment 290.

The offer recommendation data 287 represents a listing of one or more offers recommended to the user. In one embodiment, the recommended offers of offer recommendation data 287 are listed and ranked according to the degree, and any weighting, of user's attribute and offer attribute matching, and/or other user indicated parameters. In some implementations, the analysis parameters, features, assumptions, and/or processes used to perform the ranking is included in the offer recommendation data 287. In some other implementations, the offer recommendation data 287 includes a score or ranking indicating the likelihood of the user successfully obtaining the product or service that is the subject of the recommended offers represented in offer recommendation data 287 and, in one embodiment, key factors and considerations used to process, recommend, and rank the offers.

Figure 4:
FIG. 4 is an illustrative example of a user interface screen including an offer recommendation display of offer recommendation data in accordance with one embodiment.

FIG. 4 shows an illustrative example of offer recommendation data provided via a data management system user interface display 403 displayed on a user computing system display screen 401 of a user computing system 400, which in this specific illustrative example is a smart phone.

Referring to FIGS. 1, 2, and 4 together, as seen in FIG. 4, the offer recommendation data 287 is provided via a data management system user interface display 403 and includes listing of recommended offers 410 which, in this specific illustrative example, includes an offer listing including credit card offer 411.

As also seen in FIG. 4, the offer recommendation data 287 provided via the data management system user interface display 403 and credit card offer 411 includes likelihood score 421 indicating the calculated likelihood of the user successfully obtaining/qualifying for the credit card of credit card offer 411 is "very good." Also, the offer recommendation data 287 provided via the data management system user interface display 403 and credit card offer 411 includes user's attribute/offer match 423 indicting the analysis parameters, features, assumptions, and/or processes used to perform the ranking; in this specific example, that the credit card of credit card offer 411 is great for getting cash.

As also seen in FIG. 4, offer recommendation data 287 provided via the data management system user interface display 403 and credit card offer 411 includes a listing of parameters/features 425 indicating matched user's/offer attribute pairs and/or key factors and considerations used to process, recommend, and rank credit card offer 411.

Those of skill in the art will readily recognize that FIG. 4 is but one illustrative example of a mechanism/process for providing offer recommendations to a user and that numerous other examples, computing systems, displays and embodiments are possible and contemplated. Consequently. The specific example shown in FIG. 4 should not be read to limit the scope of the claims as set forth below.

Exemplary Processes

As noted above, once the various modules and models are generated and trained using the respective portion of the model training data as discussed above with respect to FIG. 1, the runtime model is executed for a specific, i.e., a given, user, also referred to herein as a first user.

Figure 5:
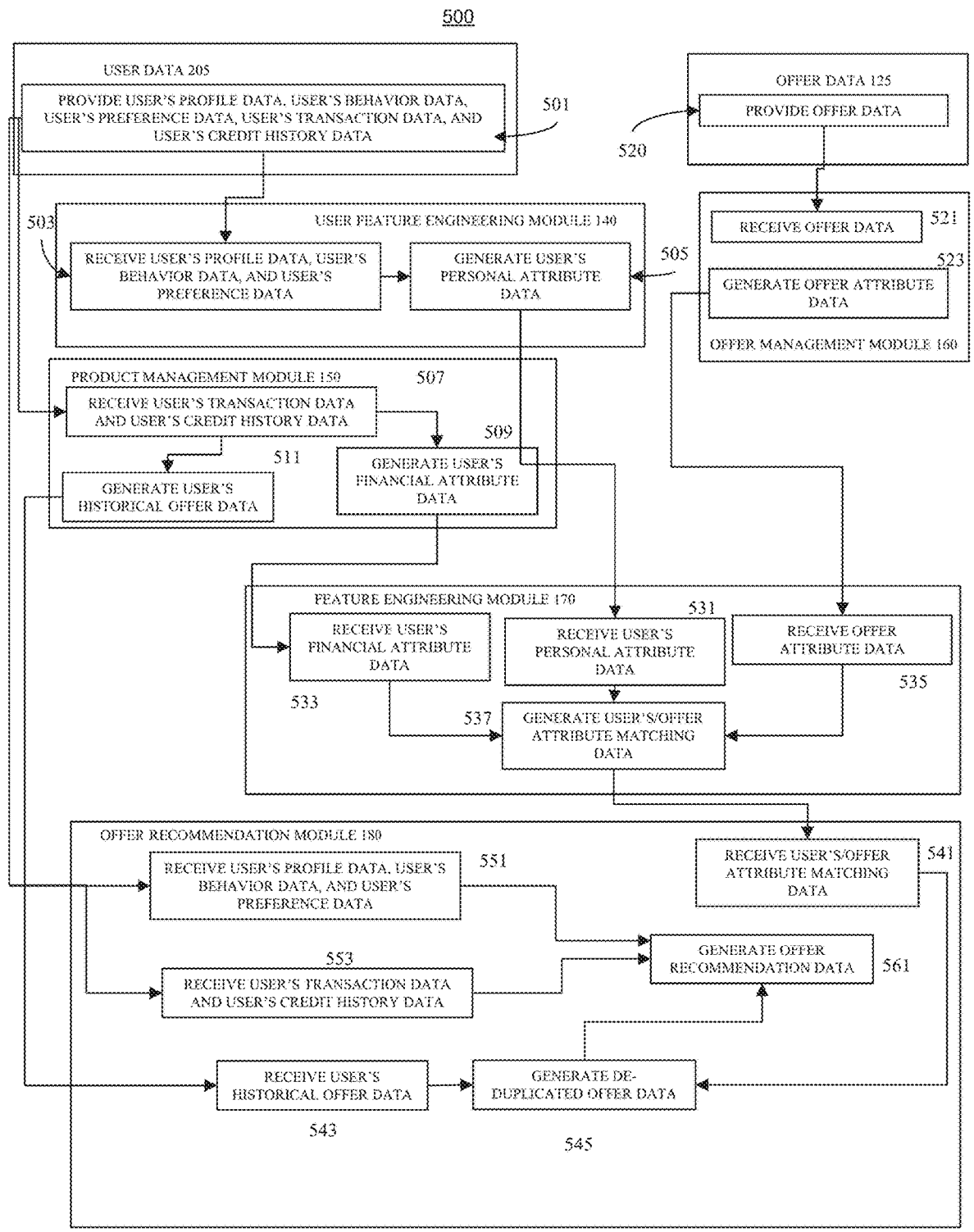
FIG. 5 is a hybrid functional and flow diagram of the runtime execution of a method and system for using machine learning techniques to make highly relevant and de-duplicated offer recommendations, in accordance with one embodiment.

FIG. 5 is a hybrid functional and flow diagram of the runtime execution of a method and system for using machine learning techniques to make highly relevant and de-duplicated offer recommendations, in accordance with some implementations.

Referring to FIGS. 1, 2, and 5 together, the user data 205, including user's profile data 210, user's behavior data 212, user's preference data 214, user's transaction data 216, and user's credit history data 218 for the given user is obtained from any one or more of the sources of profile data, behavior data, preference data, transaction data, and credit history data discussed herein, and/or as known in the art at the time of filing, and/or as become known after the time of filing.

At 501, the user's profile data 210, user's behavior data 212, user's preference data 214, user's transaction data 216, and user's credit history data 218 for the given user is provided for runtime execution of a method and system for using machine learning techniques to make highly relevant and de-duplicated offer recommendations, in accordance with one embodiment. The user feature engineering module 140 is then executed.

At 503, the user's profile data 210, user's behavior data 212, and user's preference data 214 are received by user feature engineering module 140. Then at 505 the user's profile data 210, user's behavior data 212, and user's preference data 214 are used by the personal attribute extraction model 141 of user feature engineering module 140 to generate user's personal attribute data 243 for the user. The product management module 150 is executed.

At 507, the user's transaction data 216 and user's credit history data 218 are received by the product management module 150.

At 509, the product management module 150 uses a financial attribute extraction model 155 to generate user's financial attribute data 257.

At 511, the user's historical offer data 253 is generated using the historical offer extraction engine 251 of product management module 150. The offer data 125 includes data representing currently available offers from a current offer database.

At 520, the offer data 125 is provided for runtime execution of a method and system for using machine learning techniques to make highly relevant and de-duplicated offer recommendations, in accordance with some implementations. In some instances, the offer management module 160 is executed. In one embodiment, the offer management module 160 receives offer data 125 at 521. In one embodiment, using the offer data 125 as input to an offer attribute extraction engine 161 of the offer management module 160, offer attribute data 163 for each of the offers represented in the offer data 125 is generated at 523 and registered. The offer management module 160 generates offer attribute data 163 for all active offers at 523. In some instances, the feature engineering module 170 is executed.

At 531, the feature engineering module 170 receives the user's personal attribute data 243 from the user feature engineering module 140. In one embodiment, at 533 the feature engineering module 170 receives the user's financial attribute data 243 from the product management module 150. At 535, the feature engineering module 170 receives the offer attribute data 163 from the offer management module 160. In some instances, at 537 a user/offer attribute matching model 273 of the feature engineering module 170 uses the user's personal attribute data 243, the user's financial attribute data 257, and the offer attribute data 163 to generate user's/offer attribute matching data 273. In some other instances, the offer recommendation module 180 is executed.

At 541, the offer recommendation module 180 receives the user's offer/attribute matching data 273 from the feature engineering module 170. At 543, the offer recommendation module 180 receives the user's historical offer data 253 from product management module 150.

At 545, an offer de-duplication engine 181 of the offer recommendation module 180 uses the user's offer/attribute matching data 273 and the user's historical offer data 253 to de-duplicate any offers included in the current offers that the user has already seen, has historically shown no interest in, has already accepted, that are directed to product or service types the user/consumer already owns, for which the user does not qualify, or that are otherwise deemed to be irrelevant to the user, and to generate de-duplicated offer data 283.

At 551, the offer recommendation module 180 receives user's profile data 210, user's behavior data 212, and user's preference data 214.

At 553, the offer recommendation module 180 receives the user's transaction data 216 and user's credit history data 218.

At 561, an offer recommendation model 185 of the offer recommendation module 180 uses the de-duplicated offer data 283 and at least part of the user's profile data 210, the user's behavior data 212, the user's preference data 214, the user's transaction data 216, and the user's credit history data 218, to generate offer recommendation data 287 representing one or more recommended offers for the user. In some instances, the offer recommendation data 287 is then provided to the user.

In some implementations, the offer recommendation data represents a listing of one or more offers recommended to the user. In some instances, the recommended offers are ranked according to the degree and weighting of user attribute and offer attribute matching and other user indicated parameters. The analysis parameters, features, assumptions, and/or processes used to perform the ranking is included in the offer data provided to the user. The offer recommendation data includes a score or ranking indicating the likelihood of the user successfully obtaining the product or service that is the subject of the recommended offers and, in one embodiment, key factors and considerations used to process, recommend, and rank the offers.

Figure 6:
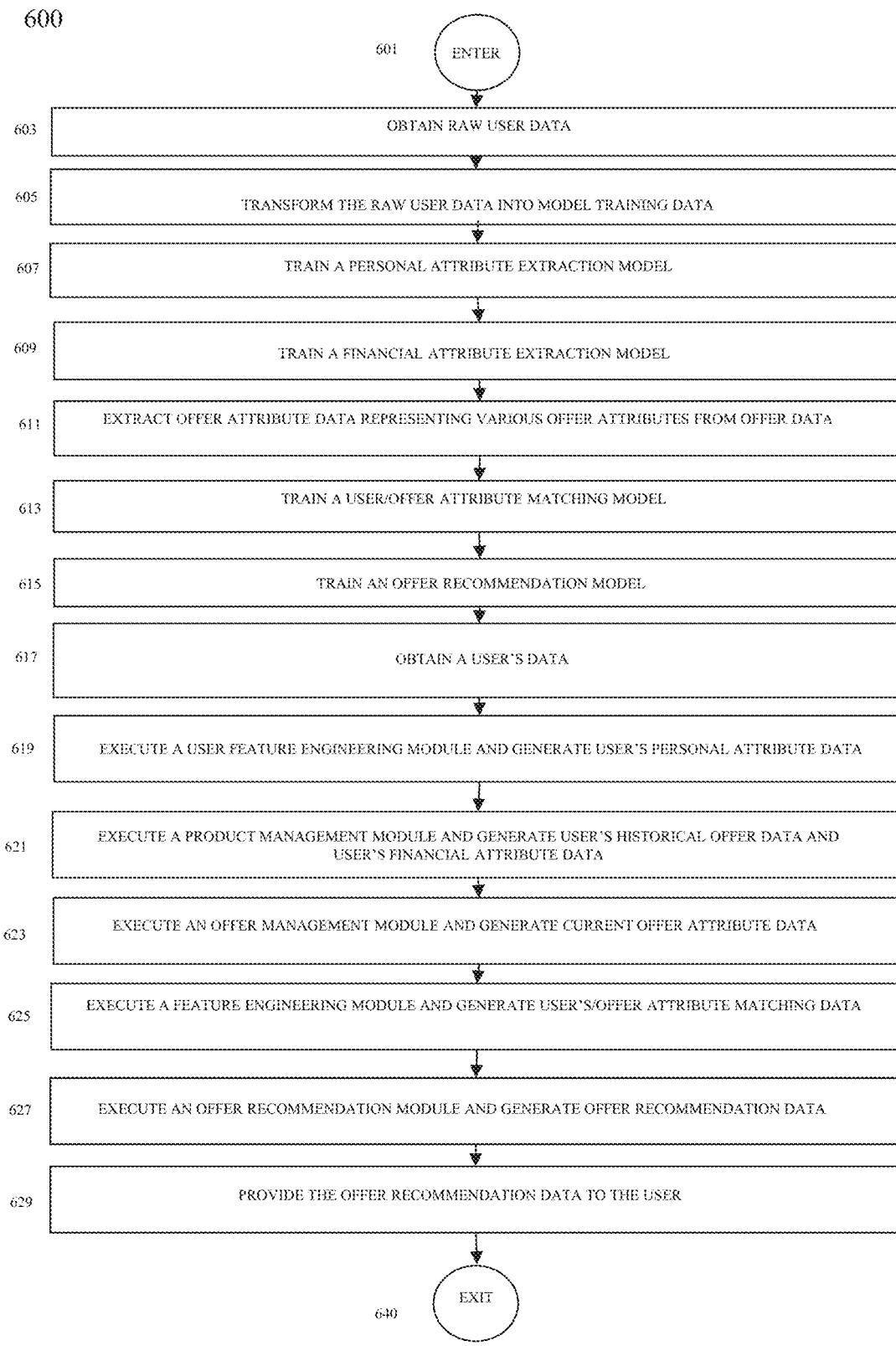
FIG. 6 is a flow diagram of process for using machine learning techniques to make highly relevant and de-duplicated offer recommendations, in accordance with one embodiment.

FIG. 6 is a flow diagram of process 600 for using machine learning techniques to make highly relevant and de-duplicated offer recommendations, in accordance with one embodiment. As seen in FIG. 6, process 600 for using machine learning techniques to make highly relevant and de-duplicated offer recommendations begins at ENTER OPERATION 601 and proceeds to OBTAIN RAW USER DATA OPERATION 603.

In some instances, at OBTAIN RAW USER DATA OPERATION 603, big data analysis methods are used to access multiple sources of user data and obtain raw user data associated with two or more, and, in various embodiments, millions, tens of millions, or hundreds of millions of, users.

In some instances, the user data of OBTAIN RAW USER DATA OPERATION 603 includes (but is not limited to) one or more of profile data, behavior data, preference data, transaction data, and credit history data associated with the two or more, and, in various embodiments, millions, tens of millions, or hundreds of millions of, users.

In some instances, the profile data portion of the raw user data of OBTAIN RAW USER DATA OPERATION 603, includes (but is not limited to) any profile data indicating a grouping or status of the users as discussed herein, and/or as known in the art of the time of filing, and/or as developed after the time of filing. In some implementations, the profile data is associated with two or more, and, in various embodiments, millions, tens of millions, or hundreds of millions of, users. In some other implementations, the profile data is obtained, at least in part, from, or through, one or more data management systems, such as, but not limited to, one or more financial management systems.

In some instances, the behavior data portion of the raw user data of OBTAIN RAW USER DATA OPERATION 603 includes (but is not limited to) any behavior data indicating traits or behaviors associated with users, as discussed herein, and/or as known in the art at the time of filing, and/or as developed, or becomes available, after the time of filing. In some implementations, the behavior data is associated with at least two or more, and, in various embodiments, millions, tens of millions, or hundreds of millions of, users. In some other implementations, the behavior data is obtained, at least in part, from, or through, one or more data management systems, such as, but not limited to, one or more financial management systems.

In some instances, the preference data portion of the raw user data of OBTAIN RAW USER DATA OPERATION 603 includes (but is not limited to) any preference data indicating various preferences or leanings associated with the users, as discussed herein, and/or as known in the art at the time of filing, and/or as developed/made available after the time of filing. In some other instances, the preference data is associated with two or more, and, in various embodiments, millions, tens of millions, or hundreds of millions of, users. In one embodiment, the preference data is obtained, at least in part, from, or through, one or more data management systems, such as (but not limited to) one or more financial management systems.

In some instances, the transaction data portion of the raw user data of OBTAIN RAW USER DATA OPERATION 603 includes (but is not limited to) any transaction data as discussed herein, and/or as known in the art at the time of filing, and/or as developed, or becomes available, after the time of filing. In still other instances, the transaction data is associated with two or more, and, in various embodiments, millions, tens of millions, or hundreds of millions of, users. In one embodiment, the transaction data is obtained, at least in part, from, or through, one or more data management systems, such as, but not limited to, one or more financial management systems.

In some instances, the credit history data portion of the raw user data of OBTAIN RAW USER DATA OPERATION 603 includes, but is not limited to, any credit and financial situational data indicating the credit and financial position of the users, as discussed herein, and/or as known in the art at the time of filing, and/or as developed or made available after the time of filing. In various embodiments, the credit history data is associated with two or more, and, in various embodiments, millions, tens of millions, or hundreds of millions of, users. In one embodiment, the credit history data is obtained, at least in part, from, or through, one or more data management systems, such as, but not limited to, one or more financial management systems.

In some instances, all the raw user data of OBTAIN RAW USER DATA OPERATION 603, including (but not limited to) the profile data, the behavior data, the preference data, the transaction data, and the credit history data is sanitized to remove all data that could be used to identify any individual user, directly or indirectly, access an individual user's data or accounts, or otherwise reveal personal information about a specific user.

In some instances, once access to the raw user data is obtained at OBTAIN RAW USER DATA OPERATION 603, process flow proceeds to TRANSFORM THE RAW USER DATA INTO MODEL TRAINING DATA OPERATION 605.

In some instances, at TRANSFORM THE RAW USER DATA INTO MODEL TRAINING DATA OPERATION 605 the raw user data of OBTAIN RAW USER DATA OPERATION 603, such as, but not limited to, the profile data, the behavior data, the preference data, the transaction data, and the credit history data, is parsed, analyzed, labeled, formatted, and/or otherwise processed, to transform the raw user data, into model training data, such as, but into limited to, profile model training data, behavior model training data, preference model training data, transaction model training data, and credit history model training data.

In some instances, once the raw user data of OBTAIN RAW USER DATA OPERATION 603 is transformed into model training data, such as, but into limited to, profile model training data, behavior model training data, preference model training data, transaction model training data, and credit history model training data at TRANSFORM THE RAW USER DATA INTO MODEL TRAINING DATA OPERATION 605, process flow proceeds to TRAIN A PERSONAL ATTRIBUTE EXTRACTION MODEL OPERATION 607.

In some instances, at TRAIN A PERSONAL ATTRIBUTE EXTRACTION MODEL OPERATION 607, various portions of the model training data, including but not limited to, one or more of, the profile model training data, the behavior model training data, and the preference model training data are used to develop and train a personal attribute extraction model of a user feature engineering module using machine learning methods. In one embodiment, the personal attribute extraction model is used for identifying and extracting various personal attributes associated with two or more, and, in various embodiments, millions, tens of millions, or hundreds of millions of, users.

In some instances, once various portions of the model training data, including but not limited to, one or more of, the profile model training data, the behavior model training data, and the preference model training data are used to develop and train a personal attribute extraction model of a user feature engineering module at TRAIN A PERSONAL ATTRIBUTE EXTRACTION MODEL OPERATION 607, process flow proceeds to TRAIN A FINANCIAL ATTRIBUTE EXTRACTION MODEL OPERATION 609.

In some instances, at TRAIN A FINANCIAL ATTRIBUTE EXTRACTION MODEL OPERATION 609, various portions of the model training data, including but not limited to, one or more of the transaction model training data and the credit history model training data is used along with machine learning methods to develop and train a financial attribute extraction model of the product management module for identifying and extracting various user's financial attributes.

In some instances, once various portions of the model training data, including but not limited to, one or more of the transaction model training data and the credit history model training data is used to develop and train a personal attribute extraction model of the product management module at TRAIN A FINANCIAL ATTRIBUTE EXTRACTION MODEL OPERATION 609, process flow proceeds to EXTRACT OFFER ATTRIBUTE DATA REPRESENTING VARIOUS OFFER ATTRIBUTES FROM OFFER DATA OPERATION 611.

In some instances, AT EXTRACT OFFER ATTRIBUTE DATA REPRESENTING VARIOUS OFFER ATTRIBUTES FROM OFFER DATA OPERATION 611 offer data representing historical and/or current offers is obtained, at least in part, from, or through, one or more providers of products and/or services and offer attribute data is extracted using an offer attribute extraction engine of an offer management module.

In some instances, AT EXTRACT OFFER ATTRIBUTE DATA REPRESENTING VARIOUS OFFER ATTRIBUTES FROM OFFER DATA OPERATION 611 the offer data is accessed by an offer management module and processed by an offer attribute extraction engine to identify and extract offer attribute data representing various offer attributes.

In some other instances, the offer attribute data of EXTRACT OFFER ATTRIBUTE DATA REPRESENTING VARIOUS OFFER ATTRIBUTES FROM HISTORICAL AND/OR CURRENT OFFER DATA OPERATION 611 includes (but is not limited to) any offer attribute data indicating the nature, requirements, operation, or structure of the offers as discussed herein, and/or as known in the art at the time of filing, and/or as developed or made available after the time of filing.

In some instances, once offer data representing historical and/or current offers is obtained, at least in part, from, or through, one or more providers of products and/or services and offer attribute data is extracted using an offer attribute extraction engine of an offer management module AT EXTRACT OFFER ATTRIBUTE DATA REPRESENTING VARIOUS OFFER ATTRIBUTES FROM OFFER DATA OPERATION 611, process flow proceeds to TRAIN A USER/OFFER ATTRIBUTE MATCHING MODEL OPERATION 613.

In some instances, at TRAIN A USER/OFFER ATTRIBUTE MATCHING MODEL OPERATION 613 the personal attribute data of TRAIN A PERSONAL ATTRIBUTE EXTRACTION MODEL OPERATION 607, the financial attribute data of TRAIN A FINANCIAL ATTRIBUTE EXTRACTION MODEL OPERATION 609, and the offer attribute data of EXTRACT OFFER ATTRIBUTE DATA REPRESENTING VARIOUS OFFER ATTRIBUTES FROM HISTORICAL AND/OR CURRENT OFFER DATA OPERATION 611 are used to generate and train one or more machine learning based user/offer attribute matching models to correlate the various user attributes to offer attributes.

In some instances, at TRAIN A USER/OFFER ATTRIBUTE MATCHING MODEL OPERATION 613 the user attribute data and offer attribute data for multiple, and, in various embodiments, millions, tens of millions, or hundreds of millions of, users and/or offers is processed and labeled for use as model training data for a user/offer attribute matching model of the feature engineering module.

In some instances, at TRAIN A USER/OFFER ATTRIBUTE MATCHING MODEL OPERATION 613 the user attribute data and offer attribute data are used to generate and train one or more machine learning based user/offer attribute matching models to correlate the various user attributes to offer attributes, in one embodiment on a user attribute/offer attribute pair basis. In one embodiment, the user/offer attribute matching model of TRAIN A USER/OFFER ATTRIBUTE MATCHING MODEL OPERATION 613 uses user attribute and offer attribute pairs as inputs and portions of one or more of the profile model training data, preference model training data, and behavior model data as labels to train a mapping model such as, but not limited to, a logistic regression model.

In some instances, once the personal attribute data, the financial attribute data, and the offer attribute data are used to generate and train one or more machine learning based user/offer attribute matching models to correlate the various user attributes to offer attributes at TRAIN A USER/OFFER ATTRIBUTE MATCHING MODEL OPERATION 613, process flow proceed to TRAIN AN OFFER RECOMMENDATION MODEL OPERATION 615.

In some instances, at TRAIN AN OFFER RECOMMENDATION MODEL OPERATION 615, portions of the model training data are used to generate and train an offer recommendation model of an offer recommendation module using machine learning methods.

In some instances, at TRAIN AN OFFER RECOMMENDATION MODEL OPERATION 615, the outputs of the product management module and the offer management module are used as inputs to the offer recommendation model of TRAIN AN OFFER RECOMMENDATION MODEL OPERATION 615. In some other instances, the offer recommendation model of TRAIN AN OFFER RECOMMENDATION MODEL OPERATION 615 uses each pair of matched user/offer attributes as input and portions of the preference model training data and the behavior model training data as labels for a mapping model, such as a logistic regression model, or any other nonlinear regression model, and/or any other mapping models as discussed herein, and/or as known or available in the art at the time of filing, and/or as is developed or comes available after the time of filing.

In some instances, once portions of the model training data are used to generate and train an offer recommendation model of the offer recommendation module using machine learning methods at TRAIN AN OFFER RECOMMENDATION MODEL OPERATION 615, process flow proceeds to OBTAIN A USER'S DATA OPERATION 617.

In some instances, once the various modules and models are generated and trained using the respective portion of the model training data, the runtime model is executed for a specific, i.e., a given, user, also referred to herein as a first user.

To this end, in one embodiment, at OBTAIN A USER'S DATA OPERATION 617, a given user's data is obtained. In one embodiment, the user's data obtained at OBTAIN A USER'S DATA OPERATION 617 includes (but is not limited to) user's profile data, user's behavior data, user's preference data, user's transaction data, and user's credit history data. In various implementations, the user's data, including the user's profile data, user's behavior data, user's preference data, user's transaction data, and user's credit history data, is any of the user's data discussed herein, and/or as known in the art at the time of filing, and/or as become known after the time of filing. In one embodiment, at OBTAIN A USER'S DATA OPERATION 617 the user's data is obtained from any one or more of the sources of profile data, behavior data, preference data, transaction data, and credit history data discussed herein, and/or as known in the art at the time of filing, and/or as become known after the time of filing.

In some instances, once user's data, including, but is not limited to, user's profile data, user's behavior data, user's preference data, user's transaction data, and user's credit history data is obtained at OBTAIN A USER'S DATA OPERATION 617, process flow proceeds to EXECUTE A USER FEATURE ENGINEERING MODULE AND GENERATE USER'S PERSONAL ATTRIBUTE DATA OPERATION 619.

In some instances, at EXECUTE A USER FEATURE ENGINEERING MODULE AND GENERATE USER'S PERSONAL ATTRIBUTE DATA OPERATION 619 the user feature engineering module is executed and user's personal attribute data is generated for the user.

In some instances, at EXECUTE A USER FEATURE ENGINEERING MODULE AND GENERATE USER'S PERSONAL ATTRIBUTE DATA OPERATION 619, the user's profile data, user's behavior data, and user's preference data of OBTAIN A USER'S DATA OPERATION 617 are used by the personal attribute extraction model to generate user's personal attribute data for the user.

In some instances, the user's personal attribute data of EXECUTE A USER FEATURE ENGINEERING MODULE AND GENERATE USER'S PERSONAL ATTRIBUTE DATA OPERATION 619 represents various user personal attributes such as (but not limited to) age group, income group, general user characteristics, user health, user education, user employment, user residence area, user financial preferences, user financial behavior, e.g., is the user a spender or saver, user risk tolerance, e.g., is the user financially risk tolerant or risk adverse, and/or any other user personal attributes, as discussed herein, and/or as known in the art at the time of filing, and/or as become known after the time of filing.

In some instances, once the user feature engineering module is executed and user's personal attribute data is generated for the user at EXECUTE A USER FEATURE ENGINEERING MODULE AND GENERATE USER'S PERSONAL ATTRIBUTE DATA OPERATION 619, process flow proceeds to at EXECUTE A PRODUCT MANAGEMENT MODULE AND GENERATE USER'S HISTORICAL OFFER DATA AND USER'S FINANCIAL ATTRIBUTE DATA OPERATION 621.

In some instances, at EXECUTE A PRODUCT MANAGEMENT MODULE AND GENERATE USER'S HISTORICAL OFFER DATA AND USER'S FINANCIAL ATTRIBUTE DATA OPERATION 621, the product management module is executed and user's historical offer data and user's financial attribute data is generated.

In some instances, at EXECUTE A PRODUCT MANAGEMENT MODULE AND GENERATE USER'S HISTORICAL OFFER DATA AND USER'S FINANCIAL ATTRIBUTE DATA OPERATION 621, the user's transaction data and user's credit history data are used by the product management module, including the historical offer extraction engine and the financial attribute extraction model, to generate user's historical offer data and user's financial attribute data, respectively.

In some instances, at EXECUTE A PRODUCT MANAGEMENT MODULE AND GENERATE USER'S HISTORICAL OFFER DATA AND USER'S FINANCIAL ATTRIBUTE DATA OPERATION 621 the product management module uses a financial attribute extraction model to extract user's financial attribute data from the user's transaction data and user's credit history data.

In some instances, the user's financial attribute data of EXECUTE A PRODUCT MANAGEMENT MODULE AND GENERATE USER'S HISTORICAL OFFER DATA AND USER'S FINANCIAL ATTRIBUTE DATA OPERATION 621 represents various user's financial attributes such as, but not limited to, financial attribute data indicating historical transaction amounts, payees, and locations, recurrence and/or frequency of transactions, withdrawals, mortgage/rent payments, credit card payments, charitable contributions, alimony or child support payments, expenses, income, insurance payments; credit card account data such as, but not limited to, account names and account holder names, balance data, status data, open and close date data, payment history data, and credit limit data; loan/mortgage data such as, but not limited to, initial mortgage/loan amount data and balance data, mortgage/loan term data, mortgage/loan payment history data, mortgage/loan status data, mortgage/loan interest rate, and mortgage/loan type data; current and historical credit scores; debt to income ratio data; savings, checking, and overdraft account balances; personal information such as, but not limited to, names, addresses, birth dates, marital status, phone numbers, employer and employment history; spending characteristics of the users, merchants used, types of purchases, products and services recently or historically purchased, general financial health, general financial characteristics, and/or any other user's financial attributes, as discussed herein, and/or as known in the art at the time of filing, and/or as become known after the time of filing.

As noted above, herein the user's personal attributes and the user's financial attributes are collectively referred to as user's attributes and the user's personal attribute data and user's financial attribute data are collectively referred to as user's attribute data.

In some implementations, at EXECUTE A PRODUCT MANAGEMENT MODULE AND GENERATE USER'S HISTORICAL OFFER DATA AND USER'S FINANCIAL ATTRIBUTE DATA OPERATION 621 the user's historical offer data is obtained using a historical offer extraction engine of the product management module.

In some other instances, at EXECUTE A PRODUCT MANAGEMENT MODULE AND GENERATE USER'S HISTORICAL OFFER DATA AND USER'S FINANCIAL ATTRIBUTE DATA OPERATION 621 the historical offer extraction engine uses natural language processing (NLP) methods, or similar text recognition and understanding techniques, to extract historical offer information/data, such as, but not limited to, one or more of, the names of providers, such as financial institutions, associated with the historical offers; categories of the providers, such as financial institutions, associated with the historical offers; terms of the historical offers; rewards or loyalty programs associated with the historical offers; approval criteria and/or acceptance rates associated with the historical offers, data indicating what specific offers have been previously made to the user, what specific offers have been accepted, what specific offers have been declined, when historical offers were made, similar historical offers declined or accepted, products and/or services the user has purchased, or owns, that are the same or similar to the products and/or services that are the subject matter of one or more current offers, and/or any other historical offer data as discussed herein, and/or as known/available in the art at the time of filing, and/or as become known/available after the time of filing.

In some instances, once the product management module is executed and user's historical offer data and user's financial attribute data is generated at EXECUTE A PRODUCT MANAGEMENT MODULE AND GENERATE USER'S HISTORICAL OFFER DATA AND USER'S FINANCIAL ATTRIBUTE DATA OPERATION 621, process flow proceeds to EXECUTE AN OFFER MANAGEMENT MODULE AND GENERATE CURRENT OFFER ATTRIBUTE DATA OPERATION 623.

In some instances, at EXECUTE AN OFFER MANAGEMENT MODULE AND GENERATE CURRENT OFFER ATTRIBUTE DATA OPERATION 623, the offer management module is executed using the current offer data as input and current offer attribute data is generated.

In some instances, at EXECUTE AN OFFER MANAGEMENT MODULE AND GENERATE CURRENT OFFER ATTRIBUTE DATA OPERATION 623, the offer management module receives the current offer data representing currently available offers from the offer database. In one embodiment, the offer attribute extraction engine of the offer management module is used to register and extract current offer attribute data for each of the offers represented in the current offer data.

In one or more implementations, the current offer attribute data of EXECUTE AN OFFER MANAGEMENT MODULE AND GENERATE CURRENT OFFER ATTRIBUTE DATA OPERATION 623 includes, but is not limited to, data indicating: the names of providers, such as financial institutions, associated with the offers; categories of the providers, such as financial institutions, associated with the offers; terms of the offers; rewards or loyalty programs associated with the offers; approval criteria and/or acceptance rates associated with the offers, and/or any other offer attribute data indicating the nature, requirements, operation, or structure of the offers as discussed herein, and/or as known in the art at the time of filing, and/or as developed or made available after the time of filing. In one embodiment, the output of the offer management module is current offer attribute data for all active offers.

In some instances, once the offer management module is executed using the current offer data as input and current offer attribute data is generated at EXECUTE AN OFFER MANAGEMENT MODULE AND GENERATE CURRENT OFFER ATTRIBUTE DATA OPERATION 623, process flow proceeds to EXECUTE A FEATURE ENGINEERING MODULE AND GENERATE USER'S/OFFER ATTRIBUTE MATCHING DATA OPERATION 625.

In some instances, at EXECUTE A FEATURE ENGINEERING MODULE AND GENERATE USER'S/OFFER ATTRIBUTE MATCHING DATA OPERATION 625 the feature engineering module is executed and user's/offer attribute matching data is generated.

In some instances, at EXECUTE A FEATURE ENGINEERING MODULE AND GENERATE USER'S/OFFER ATTRIBUTE MATCHING DATA OPERATION 625 the feature engineering module is executed using the user's attribute data, i.e., the user's personal attribute data from the user feature engineering module of EXECUTE A USER FEATURE ENGINEERING MODULE AND GENERATE USER'S PERSONAL ATTRIBUTE DATA OPERATION 619 and user's financial attribute data from the product management module of EXECUTE A PRODUCT MANAGEMENT MODULE AND GENERATE USER'S HISTORICAL OFFER DATA AND USER'S FINANCIAL ATTRIBUTE DATA OPERATION 621, and the current offer attribute data from the offer management module of EXECUTE AN OFFER MANAGEMENT MODULE AND GENERATE CURRENT OFFER ATTRIBUTE DATA OPERATION 623 as input data.

In some instances, the feature engineering module of at EXECUTE A FEATURE ENGINEERING MODULE AND GENERATE USER'S/OFFER ATTRIBUTE MATCHING DATA OPERATION 625 then generates and outputs user/offer attribute matching data. As noted above, in one embodiment, the user/offer attribute matching model of the feature engineering module of at EXECUTE A FEATURE ENGINEERING MODULE AND GENERATE USER'S/OFFER ATTRIBUTE MATCHING DATA OPERATION 625 uses user's attribute/offer attribute pairs as inputs and portions of the user's profile data, user's preference data and user's behavior data as labels to train a mapping model such as a logistic regression model, and/or any other mapping models as discussed herein, and/or as known or available in the art at the time of filing, and/or as is developed or comes available after the time of filing.

In some instances, once the feature engineering module is executed and user's/offer attribute matching data is generated at EXECUTE A FEATURE ENGINEERING MODULE AND GENERATE USER'S/OFFER ATTRIBUTE MATCHING DATA OPERATION 625, process flow proceeds to EXECUTE AN OFFER RECOMMENDATION MODULE AND GENERATE OFFER RECOMMENDATION DATA OPERATION 627.

In some instances, at EXECUTE AN OFFER RECOMMENDATION MODULE AND GENERATE OFFER RECOMMENDATION DATA OPERATION 627 the offer recommendation module is executed and offer recommendation data is generated.

In some instances, at EXECUTE AN OFFER RECOMMENDATION MODULE AND GENERATE OFFER RECOMMENDATION DATA OPERATION 627, the user's/offer attribute matching data from the feature engineering module of EXECUTE A FEATURE ENGINEERING MODULE AND GENERATE USER'S/OFFER ATTRIBUTE MATCHING DATA OPERATION 625, the current offer attribute data from the offer management module of EXECUTE AN OFFER MANAGEMENT MODULE AND GENERATE CURRENT OFFER ATTRIBUTE DATA OPERATION 623, and the user's historical offer data from the product management module of EXECUTE A PRODUCT MANAGEMENT MODULE AND GENERATE USER'S HISTORICAL OFFER DATA AND USER'S FINANCIAL ATTRIBUTE DATA OPERATION 621 are provided as input to the offer recommendation module.

In some instances, at EXECUTE AN OFFER RECOMMENDATION MODULE AND GENERATE OFFER RECOMMENDATION DATA OPERATION 627, the user's historical offer data and current offer attribute data are used by an offer de-duplication engine of the offer recommendation module to de-duplicate any offers included in the current offers that the user has already seen, has historically shown no interest in, has already accepted, that are directed to product or service types the user/consumer already owns, for which the user does not qualify, or that are otherwise deemed to be irrelevant to the user, and to generate de-duplicated offer data.

In some instances, at EXECUTE AN OFFER RECOMMENDATION MODULE AND GENERATE OFFER RECOMMENDATION DATA OPERATION 627, the user's/offer attribute matching data and the de-duplicated offer data are used by the offer recommendation model of the offer recommendation module to generate offer recommendation data representing one or more recommended offers for the user.

In some instances, once the offer recommendation module is executed and offer recommendation data is generated at EXECUTE AN OFFER RECOMMENDATION MODULE AND GENERATE OFFER RECOMMENDATION DATA OPERATION 627, process flow proceeds to PROVIDE THE OFFER RECOMMENDATION DATA TO THE USER OPERATION 629.

In some instances, at PROVIDE THE OFFER RECOMMENDATION DATA TO THE USER OPERATION 629 the offer recommendation data of EXECUTE AN OFFER RECOMMENDATION MODULE AND GENERATE OFFER RECOMMENDATION DATA OPERATION 627 is provided to the user.

In some instances, the offer recommendation data of PROVIDE THE OFFER RECOMMENDATION DATA TO THE USER OPERATION 629 represents a listing of one or more offers recommended to the user. In one embodiment, the recommended offers of PROVIDE THE OFFER RECOMMENDATION DATA TO THE USER OPERATION 629 are ranked according to the degree and weighting of user attribute and offer attribute matching and other user indicated parameters. In one embodiment, at PROVIDE THE OFFER RECOMMENDATION DATA TO THE USER OPERATION 629 the analysis parameters, features, assumptions, and/or processes used to perform the ranking is included in the offer data provided to the user. In one embodiment, the offer recommendation data of PROVIDE THE OFFER RECOMMENDATION DATA TO THE USER OPERATION 629 includes a score or ranking indicating the likelihood of the user successfully obtaining the product or service that is the subject of the recommended offers and, in one embodiment, key factors and considerations used to process, recommend, and rank the offers.

In some instances, once the offer recommendation data is provided to the user at PROVIDE THE OFFER RECOMMENDATION DATA TO THE USER OPERATION 629, process flow proceeds to EXIT OPERATION 640.

In some instances, at EXIT OPERATION 640, process 600 for using machine learning techniques to make highly relevant and de-duplicated offer recommendations is exited to await new data.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media can include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

Those of skill in the art will readily recognize that the algorithms and operations presented herein are not inherently related to any particular computing system, computer architecture, computer or industry standard, or any other specific apparatus. It may prove convenient/efficient to construct or transform one or more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

What is claimed is:

1. A method for recommending relevant and non-duplicative offers to a user of a financial management computing system, comprising:
    receiving offer data including current offers and historical offers made by the user for products or services associated with the financial management computing system;
    receiving raw user data for a plurality of users of the financial management computing system, the raw user data including one or more of profile data, behavior data, preference data, transaction data, or credit history data for each of the plurality of users;
    transforming the raw user data into model training data that includes one or more of profile training data, behavior training data, preference training data, transaction training data, or credit history training data;
    training a user/offer attribute matching model with the model training data using a machine learning process to identify attribute matching data indicative of correlations between pairs of user attributes and offer attributes;
    training an offer recommendation model with one or both of the model training data and the attribute matching data using a machine learning process to identify potential offers to be recommended to one or more users of the plurality of users;
    determining the attribute matching information by executing the trained user/offer attribute matching model, the determined attribute matching information indicating whether pairs of user attributes and offer attributes match one another;
    generating de-duplicated offer data by removing, from the offer data, offers that the user has already seen, offers that the user has already accepted, offers that the user has historically shown no interest in, or offers for which the user does not qualify;
    generating one or more recommended offers for the user by executing the trained offer recommendation model based on the determined attribute matching information and the de-duplicated offer data; and
    presenting the one or more recommended offers on a display screen viewable by the user.

2. The method of claim 1, further comprising:
    training a personal attribute extraction model with one or more of the profile training data, the behavior training data, or the preference training data of the model training data using a machine learning process to identify one or more personal attributes of the user; and
    extracting the personal attributes of the user from the raw user data by executing the trained personal attribute extraction model based on one or more of the user's profile data, behavior data, or preference data.

3. The method of claim 2, wherein the personal attribute extraction model comprises a supervised predictive model configured to receive the profile model training data, the behavior model training data, and the preference model training data as input data, and to receive one or more of the user's personal attributes as labels.

4. The method of claim 3, wherein the personal attributes include one or more of an age group, an income group, general user demographics, health, education, employment, a residence area, financial preferences, financial behavior, spending behavior, saving behavior, or risk tolerance.

5. The method of claim 1, further comprising:
    training a financial attribute extraction model with the transaction model training data and the credit history model training data using a machine learning process to identify one or more financial attributes of the user; and
    extracting the financial attributes of the user from the raw user data by executing the trained financial attribute extraction model based on one or both of the user's transaction data and the user's credit history data.

6. The method of claim 5, wherein the financial attributes include one or more of spending characteristics, merchants used, types of purchases, products and services recently or historically purchased, financial situation, financial characteristics, historical transaction amounts, payees, transaction locations, transaction recurrence or frequency of transactions, withdrawals, mortgage/rent payments, credit card payments, charitable contributions, alimony or child support payments, income, insurance payments, credit card account data, loan/mortgage, credit scores, debt to income ratio data, or bank account balances.

7. The method of claim 1, wherein:
    the user attributes include one or more of an age group, an income group, general user demographics, health, education, employment, a residence area, financial preferences, financial behavior, spending behavior, saving behavior, or risk tolerance; and
    the offer attributes include one or more of the names of providers associated with the offers, categories of the providers associated with the offers, terms of the offers, rewards or loyalty programs associated with the offers, or approval criteria or acceptance rates associated with the offers.

8. The method of claim 1, further comprising:
    training a historical offer extraction model with the transaction model training data and the credit history model training data using a machine learning process to identify historical offers of the user; and determining the historical offers by executing the trained historical offer extraction model based on one or both of the user's transaction data and the user's credit history data.

9. The method of claim 8, wherein the credit history data includes one or more of current and historical credit scores, debt to income ratio data, account balances, credit balances, credit card account data, loan/mortgage data, savings account balance data, checking account balance data, overdraft account balance data, and personal information data.

10. The method of claim 8, wherein the transaction data includes one or more of historical transaction amounts, historical transaction payees, items purchased, purchase locations, recurrence of transactions, frequency of transactions, withdrawals, mortgage/rent payments, credit card payments, charitable contributions, alimony or child support payments, expense transactions, income transactions, or insurance payments.

11. A financial management computing system configured to recommend relevant and non-duplicative offers to a user, comprising:
   one or more processors;
   a memory storing instructions that, when executed by the one or more processors, causes the system to:
      receive offer data including current offers and historical offers made by the user for products or services associated with the financial management computing system;
      receive raw user data for a plurality of users of the financial management computing system, the raw user data including one or more of profile data, behavior data, preference data, transaction data, or credit history data for each of the plurality of users;
      transform the raw user data into model training data that includes one or more of profile training data, behavior training data, preference training data, transaction training data, and credit history training data;
      train a user/offer attribute matching model with the model training data using a machine learning process to identify attribute matching data indicative of correlations between pairs of user attributes and offer attributes;
      train an offer recommendation model with one or both of the model training data and the attribute matching data using a machine learning process to identify potential offers to be recommended to one or more users of the plurality of users;
      determine the attribute matching information by executing the trained user/offer attribute matching model, the determined attribute matching information indicating whether pairs of user attributes and offer attributes match one another;
      generate de-duplicated offer data by removing, from the offer data, offers that the user has already seen, offers that the user has already accepted, offers that the user has historically shown no interest in, or offers for which the user does not qualify;
      generate one or more recommended offers for the user by executing the trained offer recommendation model based on the determined attribute matching information and the de-duplicated offer data; and
      present the one or more recommended offers on a display screen viewable by the user.

12. The financial management computing system of claim 11, wherein execution of the instructions further causes the financial management computing system to:
      train a personal attribute extraction model with one or more of the profile training data, the behavior training data, or the preference training data of the model training data using a machine learning process to identify one or more personal attributes of the user; and
      extract the personal attributes of the user from the raw user data by executing the trained personal attribute extraction model based on one or more of the user's profile data, behavior data, or preference data.

13. The financial management computing system of claim 12, wherein the personal attribute extraction model comprises a supervised predictive model configured to receive the profile model training data, the behavior model training data, and the preference model training data as input data, and to receive one or more of the user's personal attributes as labels.

14. The financial management computing system of claim 13, wherein the personal attributes include one or more of an age group, an income group, general user demographics, health, education, employment, a residence area, financial preferences, financial behavior, spending behavior, saving behavior, or risk tolerance.

15. The financial management computing system of claim 11, wherein execution of the instructions further causes the financial management computing system to:
      train a financial attribute extraction model with the transaction model training data and the credit history model training data using a machine learning process to identify one or more financial attributes of the user; and
      extract the financial attributes of the user from the raw user data by executing the trained financial attribute extraction model based on one or both of the user's transaction data and the user's credit history data.

16. The financial management computing system of claim 15, wherein the financial attributes include one or more of spending characteristics, merchants used, types of purchases, products and services recently or historically purchased, financial situation, financial characteristics, historical transaction amounts, payees, transaction locations, transaction recurrence or frequency of transactions, withdrawals, mortgage/rent payments, credit card payments, charitable contributions, alimony or child support payments, income, insurance payments, credit card account data, loan/mortgage, credit scores, debt to income ratio data, or bank account balances.

17. The financial management computing system of claim 11, wherein:
   the user attributes include one or more of an age group, an income group, general user demographics, health, education, employment, a residence area, financial preferences, financial behavior, spending behavior, saving behavior, or risk tolerance; and
   the offer attributes include one or more of the names of providers associated with the offers, categories of the providers associated with the offers, terms of the offers, rewards or loyalty programs associated with the offers, or approval criteria or acceptance rates associated with the offers.

18. The financial management computing system of claim 11, wherein execution of the instructions further causes the financial management computing system to:
      train a historical offer extraction model with the transaction model training data and the credit history model training data using a machine learning process to identify historical offers of the user; and determine the historical offers by executing the trained historical offer extraction model based on one or both of the user's transaction data and the user's credit history data.

19. The financial management computing system of claim 18, wherein the credit history data includes one or more of current and historical credit scores, debt to income ratio data, account balances, credit balances, credit card account data, loan/mortgage data, savings account balance data, checking account balance data, overdraft account balance data, and personal information data.

20. The financial management computing system of claim 18, wherein the transaction data includes one or more of historical transaction amounts, historical transaction payees, items purchased, purchase locations, recurrence of transactions, frequency of transactions, withdrawals, mortgage/rent payments, credit card payments, charitable contributions, alimony or child support payments, expense transactions, income transactions, or insurance payments.

* * * * *